(12) United States Patent
Hiraku et al.

(10) Patent No.: US 6,979,275 B2
(45) Date of Patent: Dec. 27, 2005

(54) AUXILIARY TRANSMISSION IN TRANSMISSION SYSTEM

(75) Inventors: Ryozo Hiraku, Kanagawa (JP); Shin Kobayashi, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 138 days.

(21) Appl. No.: 10/142,865

(22) Filed: May 13, 2002

(65) Prior Publication Data

US 2002/0169047 A1    Nov. 14, 2002

(30) Foreign Application Priority Data

| May 14, 2001 | (JP) | ............................. 2001-142637 |
| May 14, 2001 | (JP) | ............................. 2001-142650 |
| May 14, 2001 | (JP) | ............................. 2001-142653 |
| Oct. 23, 2001 | (JP) | ............................. 2001-325049 |

(51) Int. Cl.[7] ............................. F16H 37/02; F16H 3/44
(52) U.S. Cl. ........................... 475/214; 475/269
(58) Field of Search ................. 74/574, 340; 475/214, 475/215, 216, 218, 269, 301, 207, 209, 210, 475/317–18, 42, 48–49, 330; 192/55, 61

(56) References Cited

U.S. PATENT DOCUMENTS

| 1,699,653 | A | * | 1/1929 | Bronander | .................. 475/317 |
| 3,429,202 | A | * | 2/1969 | Galicher | ...................... 475/209 |
| 5,045,035 | A | * | 9/1991 | Ganoung | ....................... 475/42 |
| 5,733,218 | A | * | 3/1998 | Sudau et al. | .............. 74/574 X |
| 5,846,153 | A | * | 12/1998 | Matsuoka | ................... 475/269 |
| 6,397,994 | B1 | * | 6/2002 | Bowen | ....................... 192/48.9 |

FOREIGN PATENT DOCUMENTS

| EP | 0563941 | * | 3/1993 | |
| JP | 60-107662 | U | 7/1985 | |
| JP | 2-163562 | A | 6/1990 | |
| JP | 40225565 | * | 10/1990 | ................. 475/216 |
| JP | 9-137853 | A | 5/1997 | |
| JP | 11-315734 | A | 11/1999 | |
| WO | WO 01/29452 | A1 | 4/2001 | |

* cited by examiner

*Primary Examiner*—Roger Pang
(74) *Attorney, Agent, or Firm*—Foley & Lardner LLP

(57) ABSTRACT

A transmission apparatus includes at least an auxiliary transmission for supplementing a main transmission. The auxiliary transmission includes a damper which has a damper characteristic adapted to a low speed select state of the auxiliary transmission, and which is disposed in a low speed transmission path used for transmission of torque in the low speed select state of the auxiliary transmission. The auxiliary transmission further comprises a bypass member defining a bypass transmission path bypassing the low speed damper. The bypass transmission path is a torque path used for transmission of torque in a high speed select state of the auxiliary transmission.

24 Claims, 19 Drawing Sheets

FIG.9

ENGAGEMENT CONTROL OF START FRICTION ELEMENT

| RANGE | IDLE SWITCH 35 | BRAKE SWITCH 36 | VSP<5km/h | VSP=5~15km/h | VSP≥15km/h |
|---|---|---|---|---|---|
| D, R | ON (ACCELERATOR PEDAL RELEASED) | ON | FULL DISENGAGEMENT | INITIAL CONTROL | FULL ENGAGEMENT |
| | | OFF | INITIAL CONTROL | SLIPPING ENGAGEMENT CONTROL | |
| | OFF (ACCELERATOR PEDAL DEPRESSED) | ON | SLIPPING ENGAGEMENT CONTROL | SLIPPING ENGAGEMENT CONTROL | |
| | | OFF | SLIPPING ENGAGEMENT CONTROL | FULL ENGAGEMENT | |
| N, P | — | — | FULL DISENGAGEMENT | | |

AUXILIARY TRANSMISSION IN TRANSMISSION SYSTEM

BACKGROUND OF THE INVENTION

The present invention relates to an auxiliary transmission for transmission of torque, and to a transmission system including a main transmission and an auxiliary transmission.

An automatic transmission usually includes a torque converter having a function of speed change and torque multiplication and a function of absorbing torque fluctuation of an engine. A torsional damper mechanism is provided even in such an automatic transmission, for providing a damping function in a lockup mechanism of the torque converter. A toroidal continuously variable transmission system marketed as "Extroid CVT" by Nissan Motor Co., Ltd. includes a torque converter having therein a torsional damper.

SUMMARY OF THE INVENTION

It is an object of the present invention to provide an auxiliary transmission, and/or a transmission apparatus including at least an auxiliary transmission, which can be used instead of a torque converter. Another object is to provide an auxiliary transmission advantageous in damping characteristic.

According to one aspect of the present invention, a transmission apparatus comprises: at least an auxiliary transmission which is adapted to be connected with a main transmission. The auxiliary transmission comprises; a low speed damper which has a damper characteristic for a low speed select state of the auxiliary transmission, and which is disposed in a low speed transmission path used for transmission of torque in the low speed select state of the auxiliary transmission; and a bypass member defining a bypass transmission path bypassing the low speed damper. The bypass transmission path is a torque path used for transmission of torque in a high speed select state of the auxiliary transmission. The transmission apparatus may be the auxiliary transmission itself or may be a transmission system further including the main transmission.

According to another aspect of the present invention, an auxiliary transmission for supplementing a main transmission, comprises: damping means for providing a damper characteristic for a low speed select state of the auxiliary transmission, in a low speed transmission path used for transmission of torque in the low speed select state of the auxiliary transmission; and bypassing means for forming a bypass transmission path bypassing the low speed damper in a high speed select state of the auxiliary transmission.

The other objects and features of this invention will become understood from the following description with reference to the accompanying drawings.

BRIEF DESCRIPTION OF THE DRAWINGS

FIG. 9 is a table illustrating engagement control of start friction engagement element in the transmission system of FIG. 6.

DETAILED DESCRIPTION OF THE INVENTION

Figure 20:
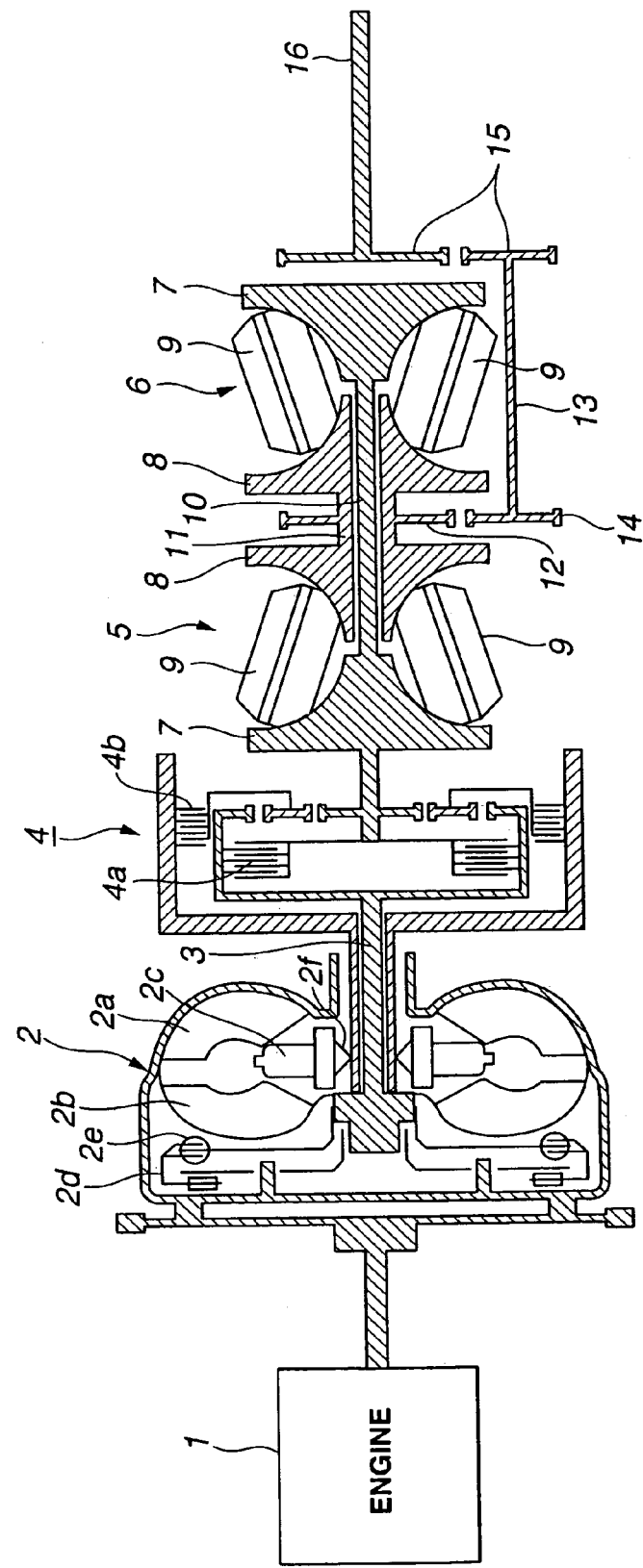
FIG. 20 is a schematic view showing a toroidal CVT transmission system including a conventional torque converter.

FIG. 20 shows a toroidal CVT system according to earlier technology. This transmission system includes a torque converter 2. Torque converter 2 includes a pump impeller 2a as power input member, a turbine runner 2b as power output member, and a stator 2c as reaction member or reactor, mounted on a one-way clutch 2f. Torque converter 2 further includes a lockup clutch 2d for directly connecting the input and output members 2a and 2b in low load, high speed operations to improve the power transmission efficiency. A damper 2e is provided in the torque path used in the lockup state, for absorbing torque fluctuation in the lockup state.

Figure 1:
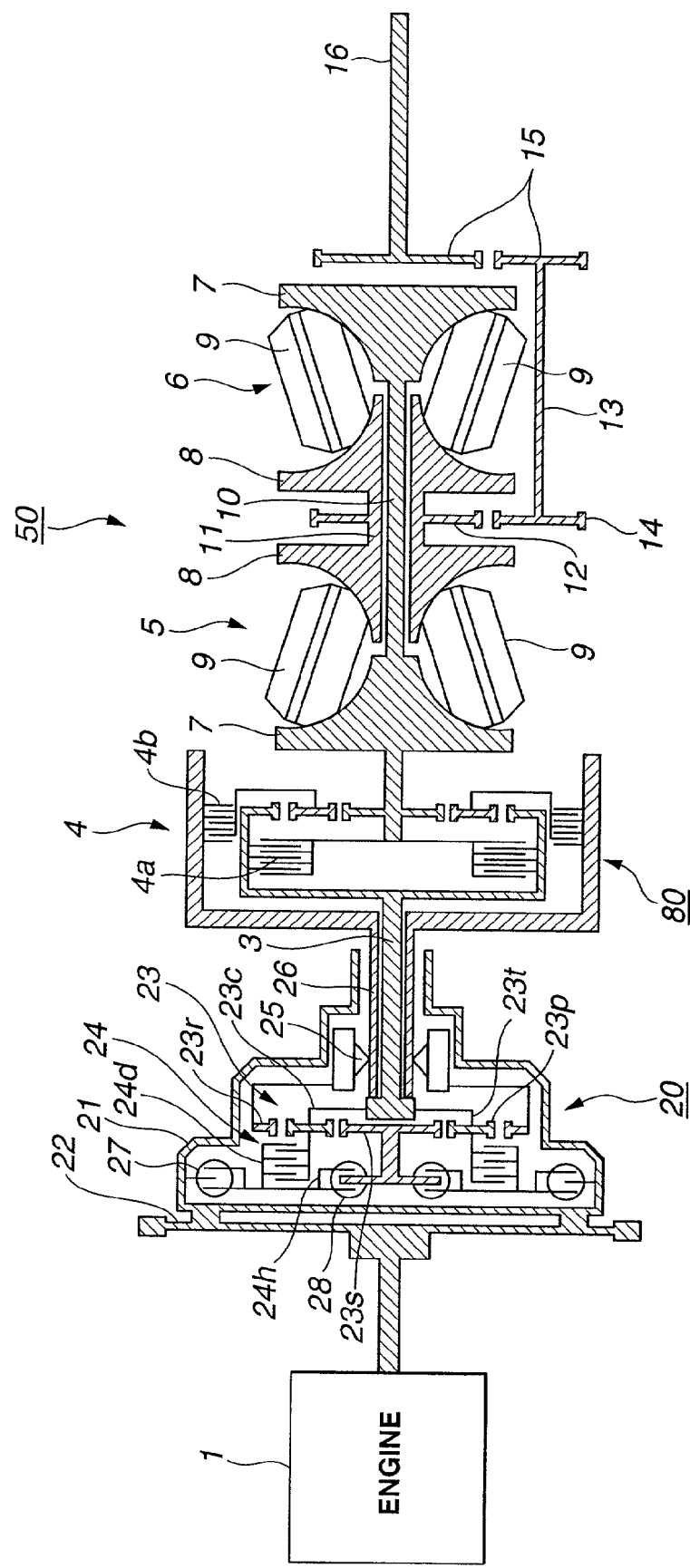
FIG. 1 is a schematic view showing a transmission system according to a first embodiment of the present invention.

FIG. 1 shows a transmission system according to a first embodiment of the present invention. In this embodiment, the transmission system is a toroidal continuously variable transmission including an auxiliary transmission 20 in place of a torque converter. Auxiliary transmission 20 is connected with a main transmission 80 including a forward-reverse switching mechanism 4 and a main unit or mechanism 50 which is an automatic transmission unit or mechanism in this embodiment.

Figure 2:
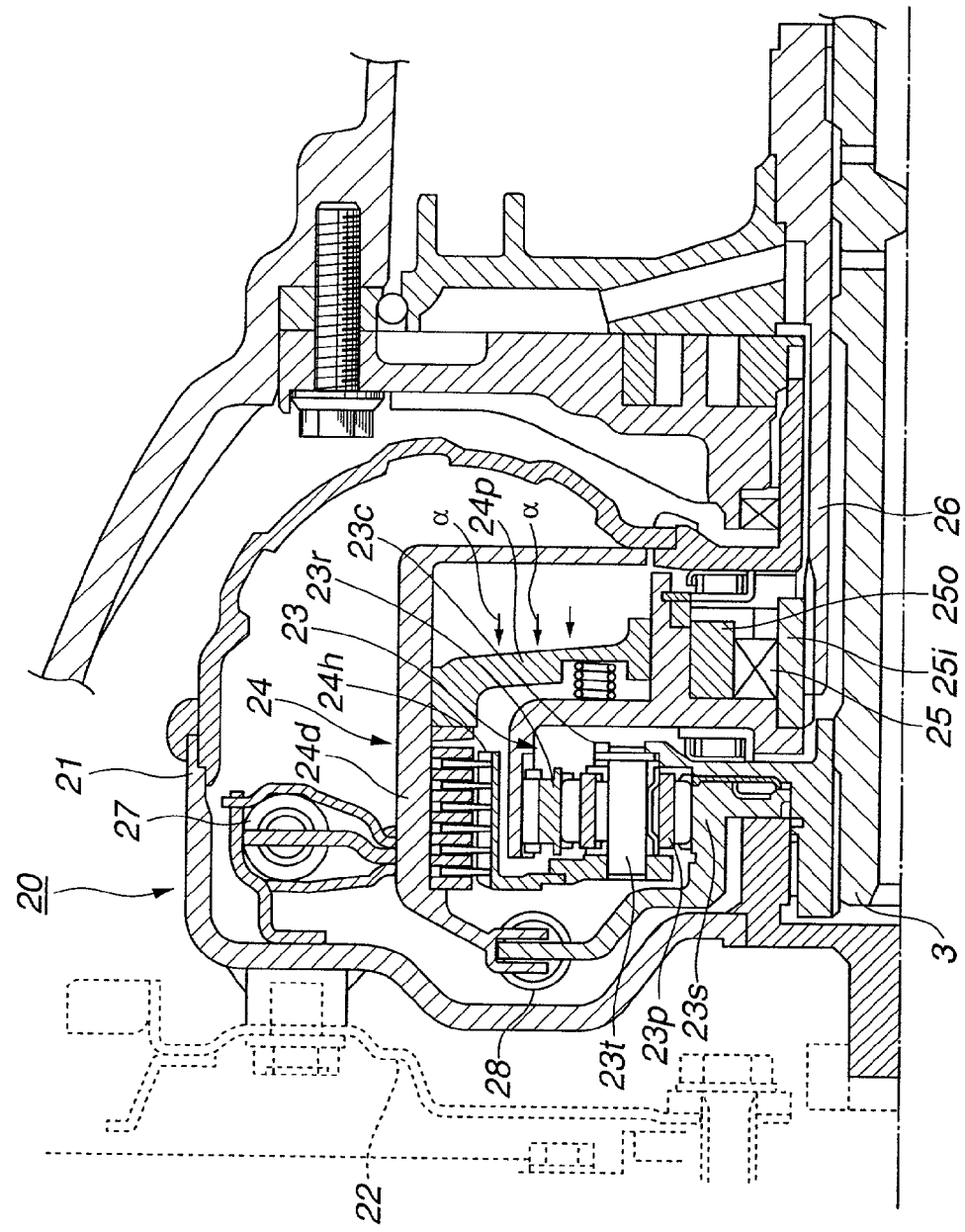
FIG. 2 is a sectional view showing a half of an auxiliary transmission of the transmission system of FIG. 1.

As shown more in detail in FIG. 2, auxiliary transmission 20 of the example shown in FIG. 1 includes a housing 21 which is connected with a prime mover 1 through a drive plate 22. In this example, prime mover 1 is an engine, and drive plate 22 is connected with a crankshaft of engine 1. At least one of housing 21 and drive plate 22 serves as an input terminal member of auxiliary transmission 20.

In housing 21, a planetary gear set 23 is mounted on an end portion of a transmission input shaft 3 extending into housing 21 of auxiliary transmission 20. Planetary gear set 23 of this embodiment is a simple planetary gear set. A planet carrier 23c of planetary gear set 23 is drivingly connected with transmission input shaft 3, and with a clutch hub 24h of a high speed select clutch 24. Transmission input shaft 3 can serve as a terminal output member of auxiliary transmission 20, for transmitting rotation from auxiliary transmission 20 to main transmission 80.

A one-way clutch 25 is connected between a ring gear 23r of simple planetary gear set 23, and a fixed shaft 26. One-way clutch 25 may be similar or identical in construction to a one-way clutch unit used for a stator of a conventional torque converter. In this example, one-way clutch 25 includes an inner race 25i fixed to fixed shaft 26 which is a hollow shaft fixed to a transmission case, and an outer race 25o connected to ring gear 23r. With this arrangement, one-way clutch 25 functions to prevent rotation of ring gear 23r in a reverse direction (second rotational direction) opposite to the rotational direction of engine 1. In this embodiment, one-way clutch 25 serves as a holding device for holding ring gear 23r serving as a reaction member of planetary gear set 23.

High speed select clutch 24 includes the above-mentioned clutch hub 24h connected with carrier 23c, and a clutch drum 24d received rotatably in housing 21. Clutch drum 24d is connected through high speed damper 27 with housing 21. Clutch drum 24d is further connected drivingly through a low speed damper 28 with a sun gear 23s of simple planetary gear set 23.

Figure 3:
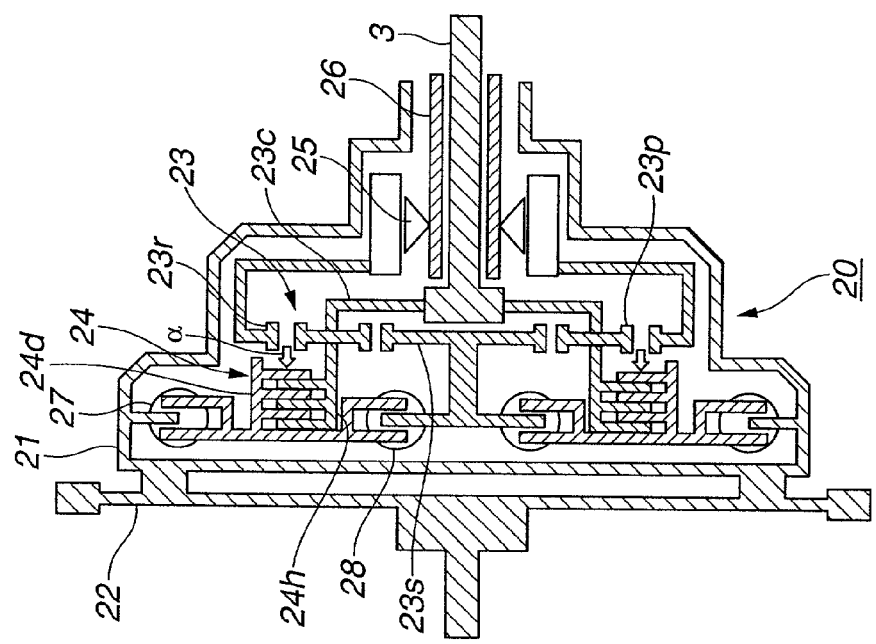
FIG. 3 is a schematic view showing the auxiliary transmission of FIG. 2 in a high speed select state.

High speed select clutch 24 further includes a clutch piston 24p fit in clutch drum 24d so that clutch piston 24p is slidable axially in clutch drum 24d. With an oil pressure α (which can be supplied by the use of a lockup control fluid pressure and an oil passage (2g) in a conventional construction), this transmission system can force clutch piston 24p leftward as viewed in FIG. 2, and engage high speed select clutch 24 to bring auxiliary transmission 20 to a high speed select state, as shown in FIG. 3. In this state, clutch drum 24d and clutch hub 24h are engaged with each other, and rotation from high speed damper 27 is transmitted through carrier 23c to transmission input shaft 3 (that is, terminal output member of auxiliary transmission 20) directly without passing through low speed damper 28. Thus, in this embodiment, high speed select clutch 24 can serve as a bypass member forming a bypass transmission path bypassing low speed damper 28.

Auxiliary transmission 20 is in a low speed select state when high speed select clutch 24 is disengaged, as shown in FIG. 1, without supply of oil pressure α. In this state, rotation from high speed damper 27 is transmitted through low speed damper 28 to sun gear 23s of simple planetary gear set 23. In low speed select speed, high speed select clutch 24 is disengaged, and one-way clutch 25 holds ring gear 23r so as to prevent rotation in the reverse direction opposite to the rotational direction of engine 1. Consequently, sun gear 23s drives carrier 23c at a reduced speed in the same rotational direction, and torque is transmitted to transmission input shaft 3 in the low speed select state for speed reduction.

High speed damper 27 is set to have a damper characteristic desired for the high speed select state, and low speed damper 28 is set to have a damper characteristic desired for the low speed select state. High and low speed dampers 27 and 28 are different in damper characteristic. In general, the low speed select state for transmitting rotation at relative low speed demands a damper having a damper characteristic of a relatively low stiffness, superior in the ability of absorbing torque fluctuation. The high speed select state for high rotational speeds demands a damper having a damper characteristic of a relatively high stiffness, superior in the durability.

In this transmission system, main transmission 80 is provided on the output (or downstream) side of auxiliary transmission 20. Main transmission 80 of this example includes, as a main component, automatic transmission mechanism 50, and forward-reverse switching mechanism 4, as mentioned before.

Forward-reverse switching mechanism 4 shown in FIG. 1 includes a forward clutch 4a (forward friction engaging device), a reverse clutch 4b (reverse friction engaging device) and a simple planetary gear set 4c.

Main transmission mechanism 50 of this example is a dual cavity toroidal CVT mechanism having a front toroidal CVT unit 5 and a rear toroidal CVT unit 6. Each of toroidal CVT units 5 and 6 includes two power rollers 9 interposed between an input disk 7 and an output disk 8. Input discs 7 are connected by a main shaft 10. Output discs 8 are connected back to back by a hollow output shaft 11 formed with an output gear 12. Output gear 12 is engaged with a counter gear 14 mounted on a front end portion of a counter shaft 13. Counter shaft 13 is connected through a gear set 15 by transmission output shaft 16 aligned with transmission input shaft 3.

Auxiliary transmission 20 according to the first embodiment is operated in the following manner.

Engine rotation inputted to housing 21 reaches clutch drum 24d through high speed damper 27. In the low speed select state where high speed select clutch 24 is disengaged, rotation to clutch drum 24d is transmitted through low speed damper 28 to sun gear 23s. Rotation is further transmitted from sun gear 23s to transmission input shaft 3 under the above-mentioned speed reducing operation of simple planetary gear set 23. In the high speed select state where high speed select clutch 24 is engaged, rotation of clutch drum 24d is transmitted through carrier 23c to transmission input shaft 3 directly without passing through low speed damper 28.

In this example, carrier 23c is used as a bypass member for forming a bypass torque path bypassing low speed damper 28. Low speed damper 28 is disposed in a low speed torque path formed between high speed damper 27 and sun gear 23s. Low speed damper 28 disposed in the low speed torque path is effective only in the low speed select state. Low speed damper 28 is ineffective as a damper in the high speed select state because torque is transmitted through the bypass passage with high speed select clutch 24 held engaged, bypassing low speed damper 28. Therefore, low speed damper 28 can be tuned to have a damper characteristic specifically adapted to the low speed select state.

Housing 21 and clutch drum 24d define a common torque path used in both the high speed select state and low speed select state, and high speed damper 27 is disposed in this common torque path. This high speed damper 27 alone carries out the damping function in the high speed select state. Therefore, it is possible to tune the damper characteristic of high speed damper 27 to the setting specifically required in the high speed select state. Auxiliary transmission 20 according to the first embodiment can fulfill the conflicting requirements of the high speed select state and the low speed select state both.

In this example, high speed damper 27 and low speed damper 28 are connected in series with each other in the low speed select state of auxiliary transmission 20. Therefore, the torsional damper mechanism of this auxiliary transmission 20 can improve the sound and vibration performance significantly with the damper stroke equaling the sum of the damper stroke of low speed damper 28 and the damper stroke of high speed damper 27.

Auxiliary transmission 20 is disposed on the input side or upstream side of toroidal CVT mechanism 50. Therefore, the torsional damper mechanism of auxiliary transmission 20 can carry out the function of absorbing torque fluctuation on the input side of toroidal CVT mechanism 50, to further improvement in the sound and vibration performance.

In this example, it is possible to use the torsional damper mechanism as auxiliary transmission 20 with no need for addition of a shaft.

In this example, one-way clutch 25 is used for holding ring gear 23*r* of planetary gear set 23 in the low speed select state. The use of one-way clutch 25 for this purpose is advantageous in that auxiliary transmission 20 can achieve the intended purpose without requiring a control action. Auxiliary transmission 20 of this example can be used in place of a torque converter provided on the input side of a conventional CVT transmission, for improving the transmission efficiency.

In this embodiment, the low speed select state is a state for speed reduction. Therefore, auxiliary transmission 20 in the low speed select state can achieve the function of torque multiplication like a conventional torque converter. Moreover, low speed damper 28 and high speed damper 27 can achieve the damping function comparable to the torque fluctuation absorbing function of a torque converter. This auxiliary transmission 20 can provide the effects of torque multiplication and absorption of torque fluctuation with no torque converter.

Auxiliary transmission 20 having the low speed select state for speed reduction is advantageous in a start control of forward clutch 4*a* or reverse brake 4*b* of forward reverse switching mechanism 4, as explained more in detail with reference to FIGS. 6~10.

Figure 4:
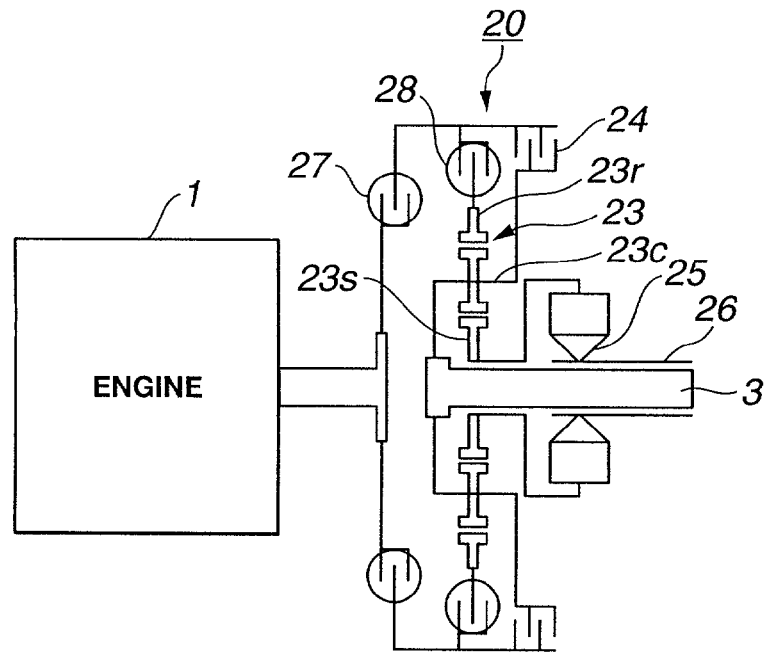
FIG. 4 is a schematic view showing an auxiliary transmission according to a second embodiment.

FIG. 4 shows an auxiliary transmission 20 according to a second embodiment of the present invention. In the second embodiment, unlike the first embodiment, low speed damper 28 is connected with ring gear 23*r* of simple planetary gear set 23, and one-way clutch 25 is connected between sun gear 23*s* of simple planetary gear set 23 and hollow fixed shaft 26. High speed damper 27 is disposed on the upstream side closer to engine 1, and low speed damper 28 is disposed on the downstream side remoter from engine 1, as in the first embodiment. A junction portion between both dampers 27 and 28 is connected through high speed select clutch 24 and carrier 23*c* of simple planetary gear set 23, to transmission input shaft 3. One-way clutch 25 acts to hold sun gear 23*s* when high speed select clutch 24 is disengaged.

In the low speed select state where high speed select clutch 24 is disengaged, engine rotation is transmitted through high speed damper 27 and low speed damper 28, to ring gear 23*r*. In simple planetary gear set 23, sun gear 23*s* serves as a reaction element since sun gear 23*s* is held by one-way clutch 25 so as to prevent rotation in the reverse direction opposite to the rotational direction of engine 1. Therefore, rotation is further transmitted from ring gear 23*r* to carrier 23*c* under the speed reducing operation of planetary gear set 23. Thus, auxiliary transmission 20 can transmit driving torque in the low speed select state to transmission input shaft 3.

In the high speed select state where high speed select clutch 24 is engaged, engine rotation transmitted through high speed damper 27 is transmitted through carrier 3*c* to transmission input shaft 3 directly without passing through low speed damper 28.

Low speed damper 28 disposed in the low speed torque path used in the low speed select state acts to perform the damping function only in the low speed select state. Low speed damper 28 does not function as a damper in the high speed select state in which driving torque is transmitted through high speed select clutch 24 bypassing low speed damper 28. Therefore, low speed damper 28 can be tuned to a damper characteristic specifically adapted to the low speed select state.

In the high speed select state, the damping function is achieved only by high speed damper 27 disposed in the common torque path used for both of the high speed select state and low speed select state. Therefore, high speed damper 27 can be tuned to the setting specifically required in the high speed select state. Auxiliary transmission 20 according to the second embodiment can fulfill the conflicting requirements of the high speed select state and the low speed select speed both.

The series arrangement of high speed damper 27 and low speed damper 28 in the low speed select state can improve the sound and vibration performance significantly with the damper stroke equaling the sum of the damper stroke of low speed damper 28 and the damper stroke of high speed damper 27. Auxiliary transmission 20 on the input side or upstream side of toroidal CVT transmission 50 can further improve the sound and vibration performance by carrying out the function of absorbing torque fluctuation on the input side. The torsional damper mechanism can be used as auxiliary transmission 20 with no need for addition of a shaft. The use of one-way clutch 25 for holding sun gear 23*s* in the low speed select state can eliminate the need for special control system. Auxiliary transmission 20 of this example can be used in place of a torque converter provided on the input side of a conventional CVT transmission, for improving the transmission efficiency. Auxiliary transmission 20 can provide the effects of torque multiplication and absorption of torque fluctuation with no torque converter.

Figure 5:
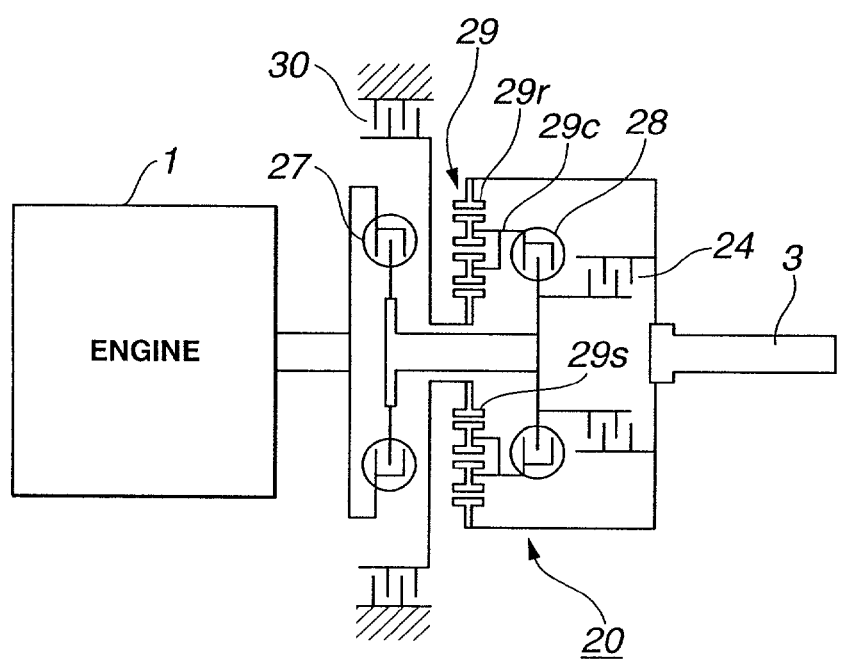
FIG. 5 is a schematic view showing an auxiliary transmission according to a third embodiment.

FIG. 5 shows an auxiliary transmission 20 according to a third embodiment of the present invention. The third embodiment employs a double pinion planetary gear set 29 instead of simple planetary gear set 23.

A carrier 29*c* of double pinion planetary gear set 29 is connected through low speed damper 28 and high speed damper 27, to engine 1. High speed damper 27 is at a position closer, in the torque path, to engine 1. Moreover, high speed select clutch 24 is connected between a ring gear 29*r* of double pinion planetary gear set 29 and a portion of a transmission path between these dampers 27 and 28. This ring gear 29*r* is connected to a transmission input shaft 3. A low speed select brake 30 is disposed between a sun gear 29*s* of double pinion planetary gear set 29, and a stationary member, so that sun gear 29*s* can be held by low speed select brake 30.

The thus-constructed auxiliary transmission 20 is in the low speed select state when low speed select brake 30 is engaged to hold sun gear 29s, and high speed select clutch 24 is disengaged. In this low speed select state, rotation of engine is transmitted through high speed damper 27 and low speed damper 28, to carrier 29c, and rotation is further transmission from carrier 29c to ring gear 29r at a reduced speed by using, as a reaction member, sun gear 29s held by low speed select brake 30. Thus, auxiliary transmission 20 of FIG. 5 can transmit driving torque to transmission input shaft 3 in the speed reduction mode when auxiliary transmission 20 is in the low speed select state. In the high speed select state where high speed select clutch 24 is engaged, engine rotation is transmitted directly to transmission input shaft 3 through the torque path bypassing low speed damper 28.

Low speed damper 28 disposed in the low speed torque path used only in the low speed select state acts to perform the damping function only in the low speed select state. Low speed damper 28 does not function as a damper in the high speed select state in which driving torque is transmitted through high speed select clutch 24 bypassing low speed damper 28. Therefore, low speed damper 28 can be tuned to a damper characteristic specifically adapted to the low speed select state.

In the high speed select state, the damping function is achieved only by high speed damper 27 disposed in the common torque path used for both of the high speed select state and low speed select state. Therefore, high speed damper 27 can be tuned to the setting specifically required in the high speed select state. Auxiliary transmission 20 according to the third embodiment can fulfill the conflicting requirements of the high speed select state and the low speed select speed both.

The series arrangement of high speed damper 27 and low speed damper 28 in the low speed select state can improve the sound and vibration performance significantly with the damper stroke equaling the sum of the damper stroke of low speed damper 28 and the damper stroke of high speed damper 27. Auxiliary transmission 20 on the input side or upstream side of toroidal CVT transmission 50 can further improve the sound and vibration performance by carrying out the function of absorbing torque fluctuation on the input side. The torsional damper mechanism can be used as auxiliary transmission 20 with no need for addition of a shaft. The use of one-way clutch 25 for holding sun gear 23s in the low speed select state can eliminate the need for special control system. Auxiliary transmission 20 of this example can be used in place of a torque converter provided on the input side of a conventional CVT transmission, for improving the transmission efficiency. Auxiliary transmission 20 can provide the effects of torque multiplication and absorption of torque fluctuation with no torque converter.

FIGS. 6~10 show a transmission system according to a fourth embodiment of the present invention.

Auxiliary transmission 20 and main transmission 80 including forward-reverse switching mechanism 4 and toroidal CVT mechanism 50 are substantially identical to those shown in FIG. 1.

Figure 6:
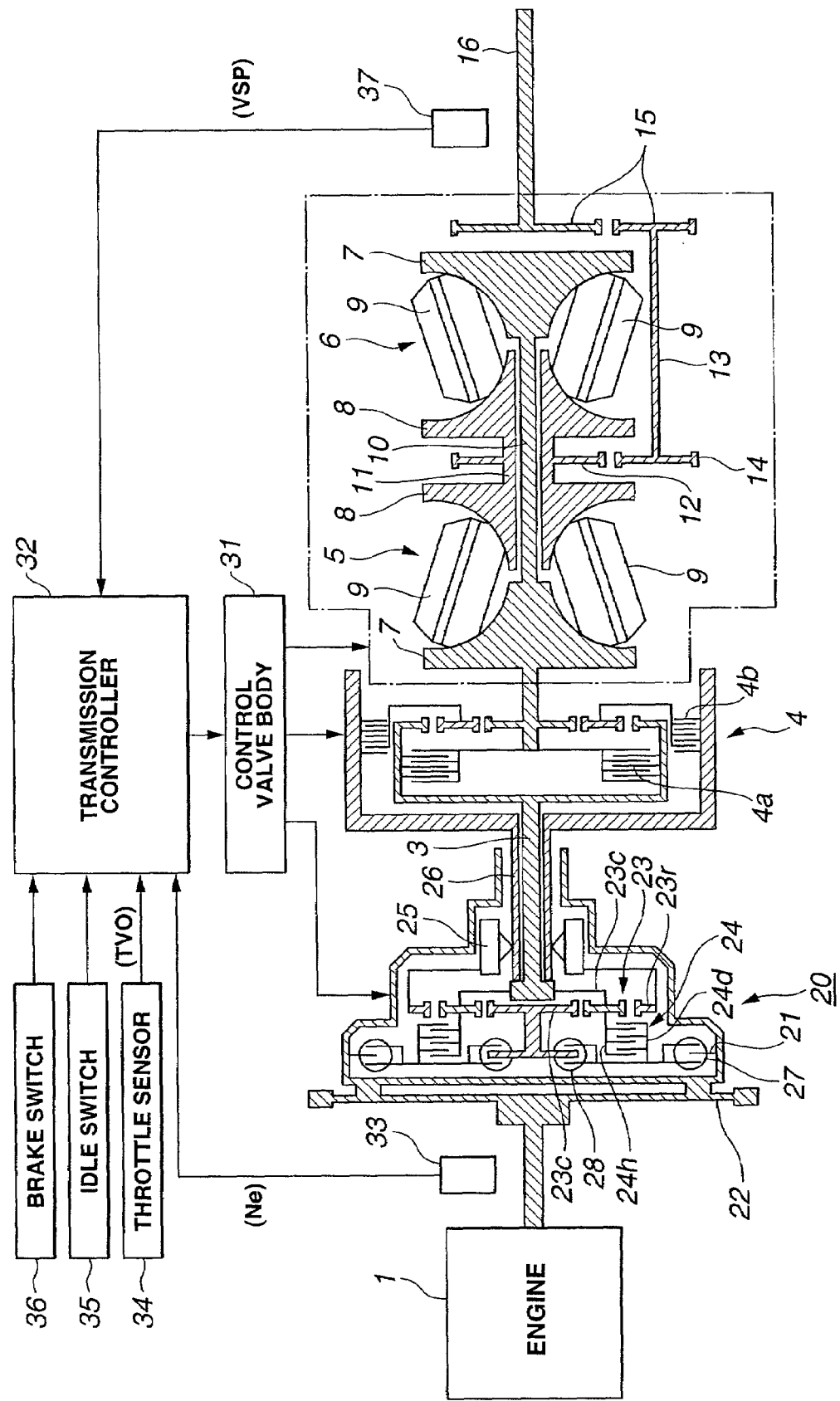
FIG. 6 is a schematic view showing a transmission system according to a fourth embodiment.
Figure 7:
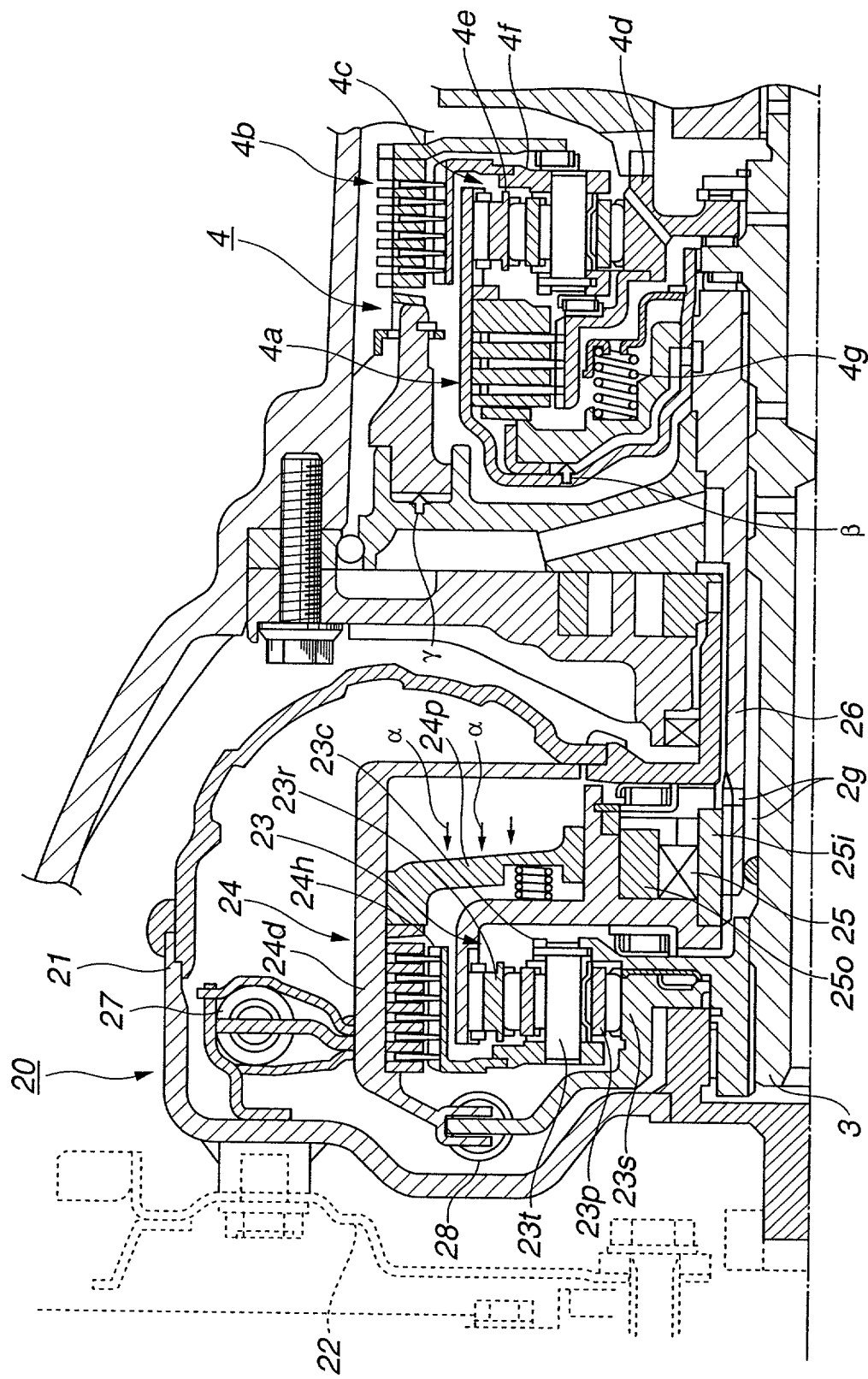
FIG. 7 is a sectional view showing an auxiliary transmission and a forward-reverse switching mechanism of the transmission system of FIG. 6.
Figure 8:
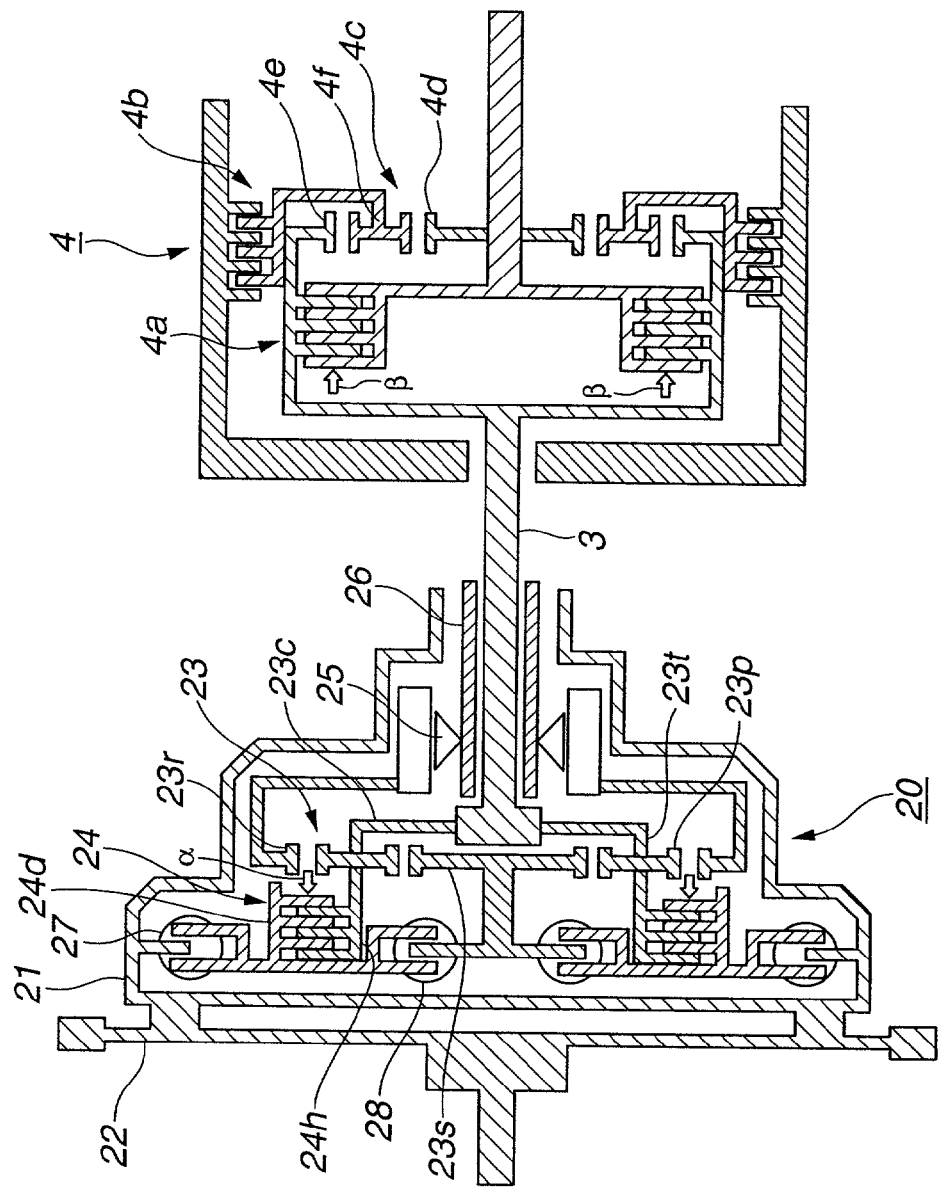
FIG. 8 is a schematic view showing the auxiliary transmission of FIG. 7 in the high speed select state and the forward-reverse switching mechanism of FIG. 7 in a forward drive state

Forward-reverse switching mechanism 4 shown in FIGS. 6~8 includes a forward clutch 4a, a reverse brake 4b and a simple planetary gear set 4c as in the first embodiment.

Forward clutch (forward friction engaging device) 4a, when engaged by fluid pressure β, connects a sun gear 4d and a ring gear 4e of planetary gear set 4c drivingly, and thereby transmits rotation from transmission input shaft 3 directly to sun gear 4d connected with the next toroidal CVT mechanism 50. Therefore, this transmission system is in a state for forward driving in D range.

Reverse brake (reverse friction engaging device) 4b, when engaged by fluid pressure γ, holds a carrier 4f of simple planetary gear set 4c, and enables transmission of input rotation of transmission input shaft 3, from sun gear 4d to toroidal transmission mechanism 50 at a reduced speed in the reverse direction. The transmission system is in a state for backward driving in R range.

For stopping and parking in N and P ranges, forward clutch 4a and reverse brake 4b are both disengaged, so that rotation of transmission input shaft 3 is not transmitted to toroidal CVT unit 50.

A transmission controller 32 controls auxiliary transmission 20, forward-reverse switching mechanism 4 and toroidal CVT unit 50 with a control valve body 31. Specifically, transmission controller 32 controls forward clutch 4a and reverse brake 4b of forward-reverse switching mechanism 4, and high speed select clutch 24 of auxiliary transmission 20.

Information on various operating conditions is collected by a sensor section (or input section) and supplied to transmission controller 32. In this embodiment, the sensor section includes the following sensors.

An engine speed sensor 33 senses an engine speed Ne of engine 1. A throttle position sensor 34 senses a throttle opening degree TVO of engine 1. An idle switch 35 senses an idling condition, by turning on when an accelerator pedal is released. A brake switch 36 senses a braking condition of the vehicle by turning on when a brake pedal is depressed. A vehicle speed sensor 37 senses a vehicle speed VSP. Signals from these sensors and switches are supplied to transmission controller 32.

Auxiliary transmission 20 is operated in the same manner as in the first embodiment shown in FIGS. 1~3. Rotation transmitted to transmission input shaft 3 by auxiliary transmission 20 in the low speed select state or in the high speed select state is further transmitted to toroidal CVT mechanism 50 when forward clutch 4a is engaged by the supply of fluid pressure β. Toroidal CVT mechanism 50 performs the speed varying operation and delivers output rotation from transmission output shaft 16.

Transmission controller 32 performs start control and shift control in the following manner.

For starting, transmission controller 32 puts auxiliary transmission 20 in the low speed select state for speed reduction by disengaging high speed select clutch 24, and then brings main transmission 80 from the neutral state in which forward clutch 4a and reverse brake 4b are both disengaged, to the forward or reverse drive state by controlling engagement of the start friction engaging element which is forward clutch 4a in the case of forward start in D range, and which is reverse brake 4b in the case of reverse start in R range.

Transmission controller 32 controls the start friction engaging element (4a or 4b in this example) as shown in FIG. 9. In the case of forward starting operation, the transmission system is operated in the following manner.

When idle switch 35 is ON in D range because of accelerator pedal being not yet depressed, and brake switch 36 is also ON because of the brake pedal being depressed: In this case, if the vehicle is in a stop state in which vehicle speed VSP is lower than 5 km/h, transmission controller 32 still holds the toroidal transmission in the neutral state by fully disengaging forward clutch 4a. If vehicle speed VSP is in the range of 5 Km/h~15 Km/h, transmission controller 32 puts forward clutch 4a in an engagement start ready state in which compression of return spring 4g shown in FIG. 7 ends, and a loss stroke of the clutch ends (initial control). The engagement start ready state is a state of the start friction engagement element just before a start of engagement. If vehicle speed VSP is higher than or equal to 15 Km/h, then transmission controller 32 fully engages forward clutch 4a and thereby puts the toroidal CVT transmission system in the normal driving state in which the transmission system can transmit torque in D range at a speed ratio on a low side with auxiliary transmission 20 in the low speed select state and main transmission 80 in the normal driving state.

When idle switch 35 is ON in D range because of accelerator pedal being not yet depressed, but brake switch 36 turns OFF because of the brake pedal being released to cancel the application of brake: In this case, transmission controller 32 starts the initial control to put forward clutch 4a in the engagement start ready state in which return spring 4g shown in FIG. 7 is fully compressed, and a loss stroke of the clutch ends, from the stop state in which vehicle speed VSP is lower than 5 km/h. If vehicle speed VSP is in the range of 5 Km/h~15 Km/h, transmission controller 32 performs a slipping engagement control to increase the degree of engagement of forward clutch 4a gradually from the engagement start ready state. If vehicle speed VSP exceeds 15 Km/h, then transmission controller 32 fully engages forward clutch 4a and thereby puts the toroidal CVT transmission system in the normal driving state in which the transmission system can transmit torque in D range at a speed ratio on the low side with auxiliary transmission 20 in the low speed select state and main transmission 80 in the normal driving state.

When idle switch 35 turns OFF in D range in response to depression of the accelerator pedal, and brake switch 36 is ON because of the brake pedal being depressed: In this case, transmission controller 32 performs the slipping engagement control to increase the degree of engagement of forward clutch 4a gradually even in the stop state of VSP<5 km/h. In the vehicle speed range of 5 Km/hr~15 Km/h, transmission controller 32 continues the slipping engagement control and further increases the degree of engagement of forward clutch 4a. If vehicle speed VSP exceeds 15 Km/h, then transmission controller 32 fully engages forward clutch 4a and thereby puts the toroidal CVT transmission system in the normal driving state in which the transmission system can transmit torque in D range at a speed ratio on the low side with auxiliary transmission 20 in the low speed select state and main transmission 80 in the normal driving state.

When idle switch 35 is OFF in D range because of depression of accelerator pedal, and brake switch 36 is also OFF because of the brake pedal being released: In this case, transmission controller 32 performs the slipping engagement control to increase the degree of engagement of forward clutch 4a gradually, from the stop state of VSP<5 km/h. In the vehicle speed range of 5 Km/h~15 Km/h, transmission controller 32 fully engages forward clutch 4a, and thereby puts the toroidal CVT transmission system in the normal driving state in which the transmission system can transmit torque in D range at a speed ratio on the low side with auxiliary transmission 20 in the low speed select state and main transmission 80 in the normal driving state. If vehicle speed VSP is higher than or equal to 15 Km/h, then transmission controller 32 maintains the full engagement state of forward clutch 4a and thereby holds the toroidal CVT transmission system in the normal driving state.

In N and P ranges, transmission controller 32 holds the toroidal CVT transmission system in the neutral state by full disengagement of forward clutch 4a and reverse brake 4b, without regard to whether the accelerator pedal is released or depressed (whether idle switch 35 is ON or OFF, that is), and without regard to whether the brake pedal is depressed or not (whether brake switch 36 is ON or OFF, that is).

Figure 10:
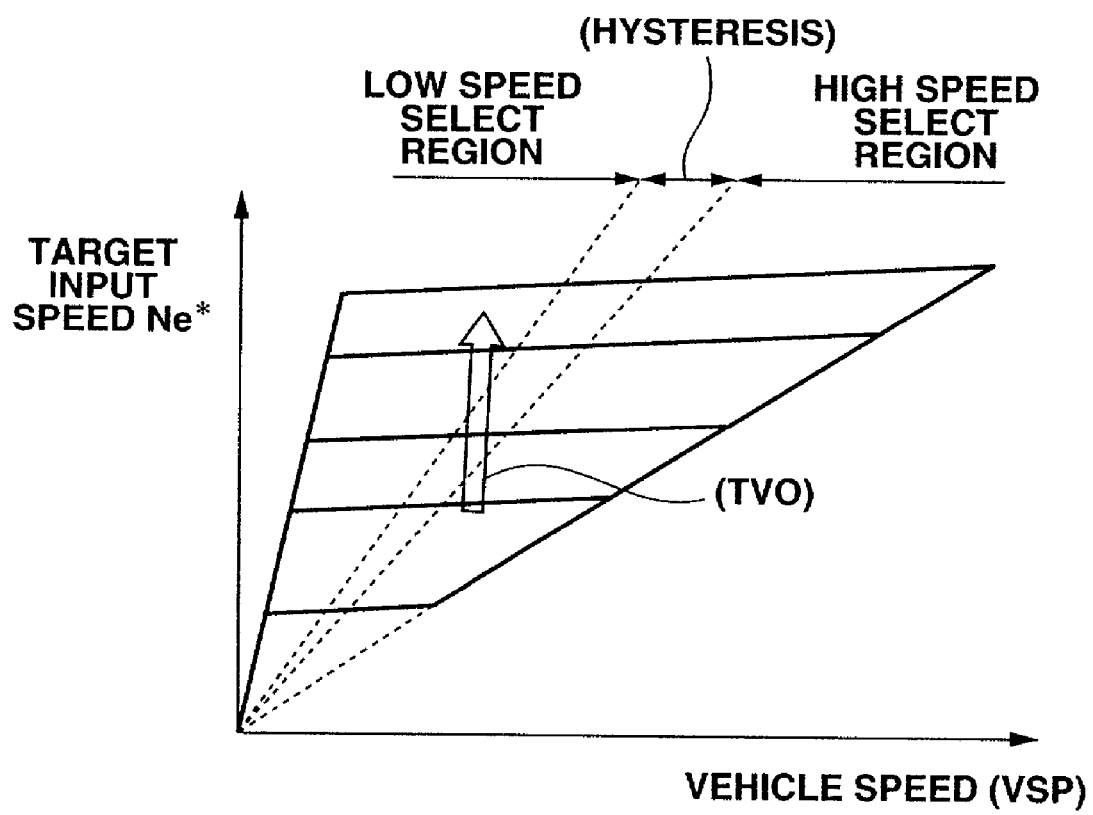
FIG. 10 is a graph illustrating a shift pattern used in a transmission controller shown in FIG. 6.

After the toroidal CVT transmission system is brought to the normal driving state in D range, transmission controller 32 determines a target input speed Ne* in accordance with vehicle speed VSP and throttle opening TVO by using a shift control map as shown in FIG. 10, and controls the speed ratio of first and second toroidal CVT units 5 and 6 so as to reduce the deviation of actual engine speed Ne sensed by sensor 33 from the target input speed Ne*. By using the shift control map of FIG. 10, transmission controller 32 checks whether the operating point determined from vehicle speed VSP and throttle opening TVO is in a low speed select region to put auxiliary transmission 20 in the low speed select state, or in a high speed select region to put auxiliary transmission 20 in the high speed select state.

If the operating point is in the low speed select region, then transmission controller 32 puts auxiliary transmission 20 in the low speed select state 24 by disengagement of high speed select clutch, and performs the above-mentioned start control while holding auxiliary transmission 20 in the low speed select state. If it is judged that the operating point enters the high speed select region beyond a region of hysteresis, transmission controller 32 shifts auxiliary transmission 20 to the high speed select state by engaging high speed select clutch 24 as shown in FIG. 8, and enables the shift control as shown in FIG. 10 with auxiliary transmission 20 in the high speed select state and forward clutch 4a held engaged.

In the fourth embodiment, the start control is performed by holding auxiliary transmission 20 in the low speed select state for speed reduction, and increasing the degree of engagement of the start friction element (which is forward clutch 4a in the case of D range, and which is reverse brake 4b in the case of R range) to bring toroidal CVT mechanism 50 of main transmission 80 from the neutral state to the drive state, as shown in FIG. 9. Therefore, this automatic transmission system enables starting operations similar to operations in a manual transmission, and eliminates the need for a torque converter to solve the problem of transmission efficiency caused by the involvement of torque converter.

Auxiliary transmission 20 is held in the low speed select state in starting operation. Therefore, auxiliary transmission 20 can perform the function of torque multiplication like a torque converter, and avoid the problem of decrease in driving performance caused when an electromagnetic clutch is employed. Auxiliary transmission 20 in the low speed select state or speed reduction state can decrease the speed of input rotation to the start friction element (4a or 4b). Therefore, this transmission system can improve the durability of the start friction element and facilitates the engagement control of the start friction element.

In the fourth embodiment, the transmission system shown in FIG. 6 is a control system including transmission controller 32. According to the fourth embodiment, a transmission apparatus is a transmission system for a vehicle, and the transmission apparatus comprises at least; a main transmission including a friction element which is disengaged when the main transmission is in a neutral state and which is engaged when the main transmission in a drive state; and an auxiliary transmission including a selecting device which is in a first device state when the auxiliary transmission is in a low speed select state for transmitting rotation to the main transmission in a speed reduction mode, and which is a second device state when the auxiliary transmission in a high speed select state for transmitting rotation to the main transmission in a higher speed mode. For example, the auxiliary transmission may be any one of the various auxiliary transmissions 20 and 20' disclosed in the illustrated embodiments. The transmission apparatus further comprises a controlling section to control the friction element to start the vehicle while putting the auxiliary transmission in the low speed select state. The controlling section may include transmission controller 32. The controlling section may further include control valve body 31 and various sensors such as items 33~37.

The transmission apparatus may be arranged so that: The main transmission comprises an automatic transmission mechanism, and a forward-reverse switching mechanism which is connected between the auxiliary transmission and the automatic transmission mechanism. The forward-reverse switching mechanism comprises a forward friction engaging device to put the main transmission in a forward drive state when the forward friction engaging device is engaged, and a reverse friction engaging device to put the main transmission in a reverse drive state when the reverse friction engaging device is engaged, and to put the main transmission in the neutral state when the forward friction engaging device and the reverse friction engagement device are both disengaged. The controlling section may be configured to control the main transmission from the neutral state to the forward drive state to start the vehicle forward, by bringing the friction element which is the forward friction engaging device from an disengagement state to an engagement state while the auxiliary transmission is in the low speed select state.

Figure 11:
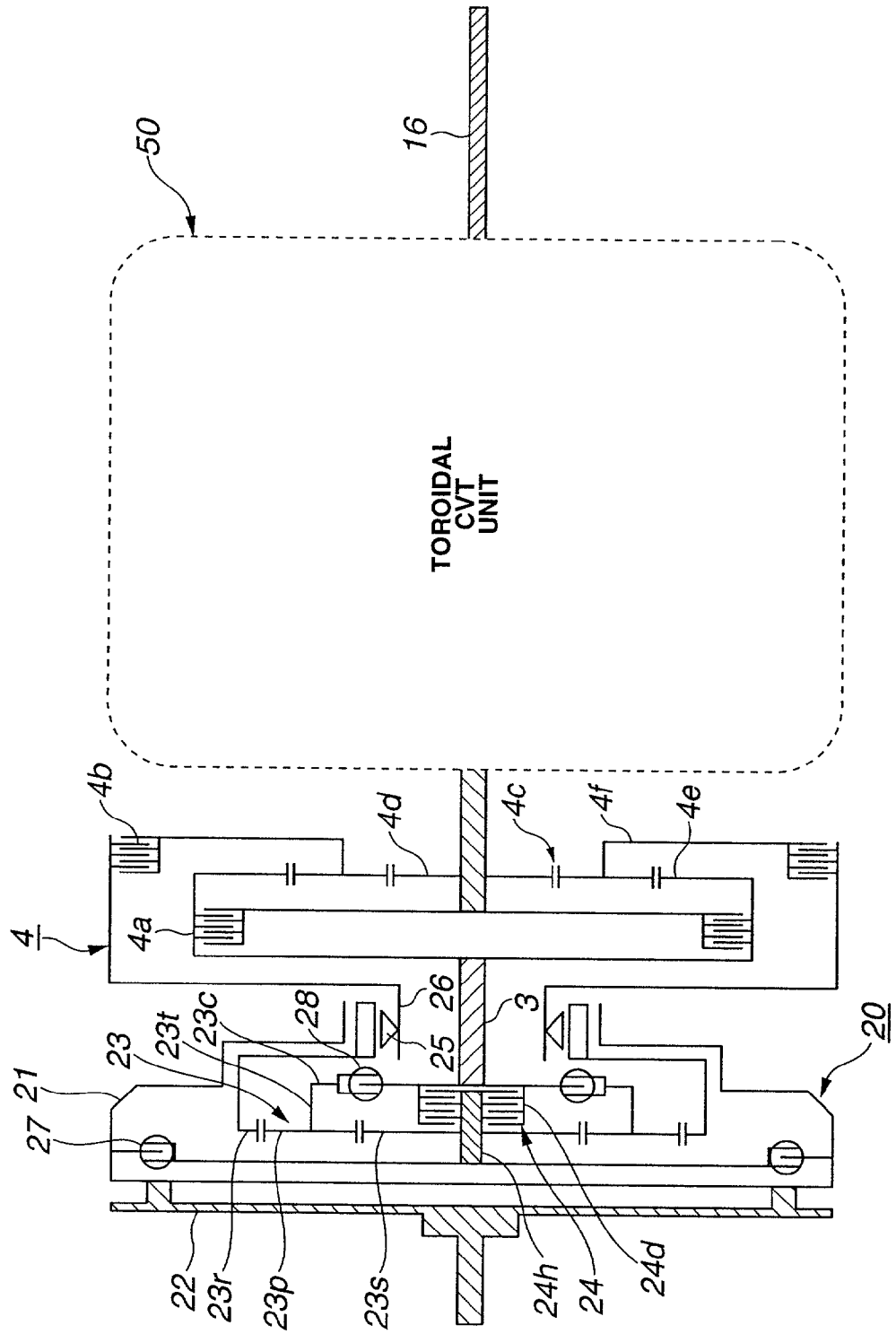
FIG. 11 is a schematic view showing a toroidal CVT transmission system according to a fifth embodiment of the present invention.
Figure 12:
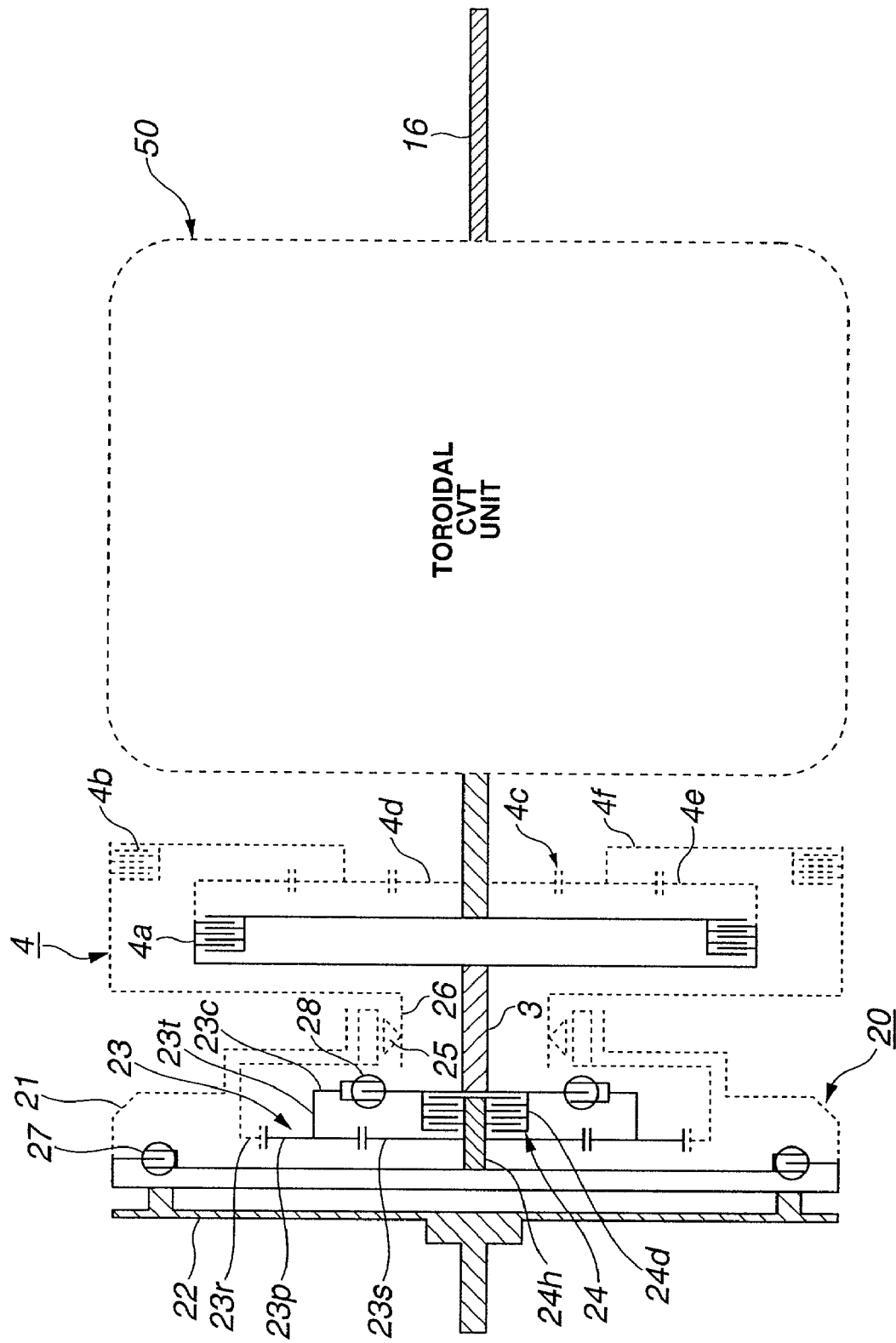
FIG. 12 is a schematic view showing the toroidal CVT transmission system of FIG. 11, with an auxiliary transmission in a low speed select state.
Figure 13:
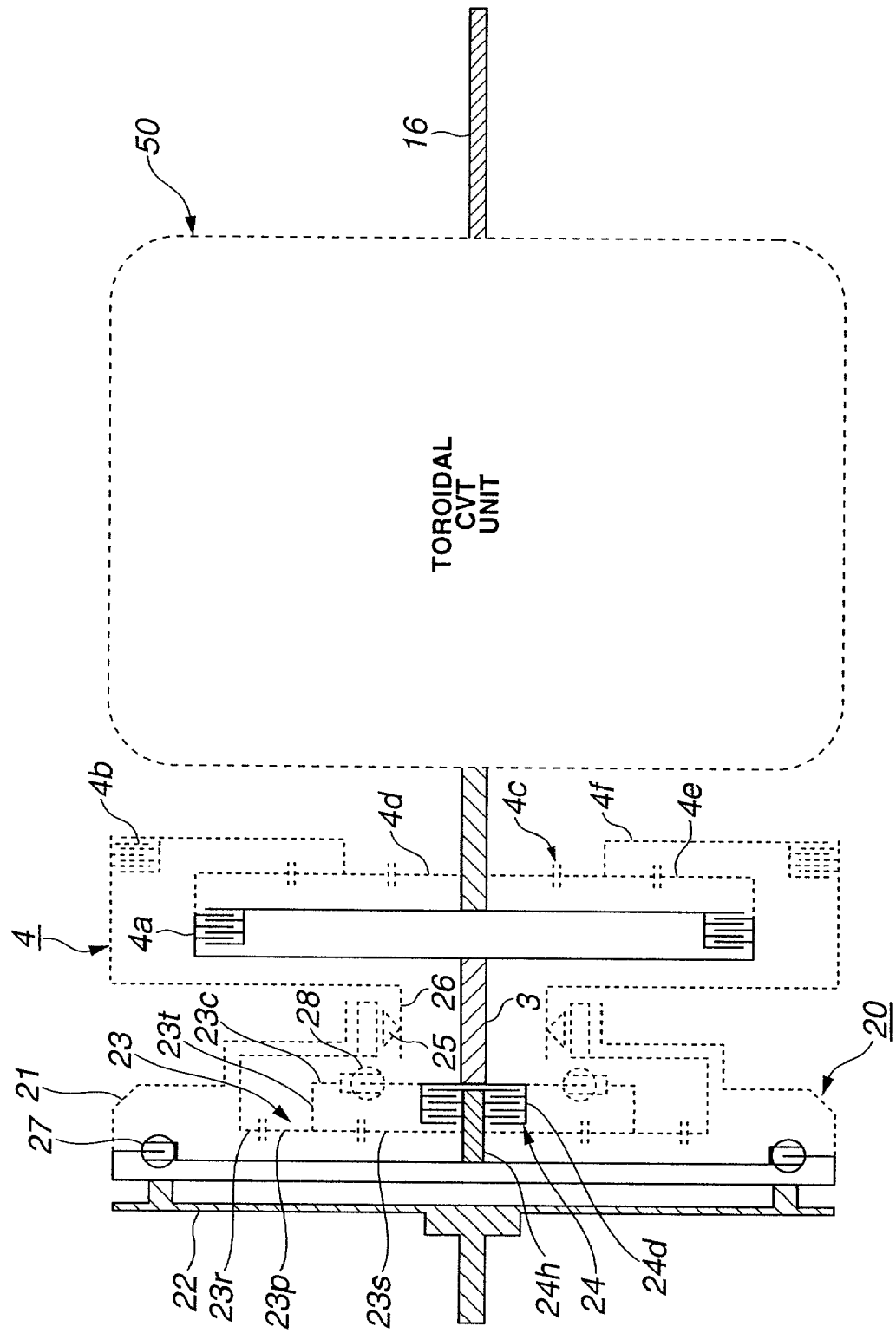
FIG. 13 is a schematic view showing the toroidal CVT transmission system of FIG. 11, with the auxiliary transmission in a high speed select state.

FIGS. 11, 12 and 13 show a transmission system according to a fifth embodiment of the present invention. In the first embodiment, carrier 23c of planetary gear set 23 is used as a torque path in both of the high speed select (direct drive) state and the low speed select (speed reduction) state of auxiliary transmission 20, and hence each pinion shaft 23t must always bear the load. Therefore, specifically in the case of a high output engine, this arrangement can deteriorate the durability of pinion shafts 23t, and decrease the life span of auxiliary transmission 20. The use of thick pinion shafts can complicate the requirements of pinions 23p and increase the size of the planetary gear set in auxiliary transmission 20.

Auxiliary transmission 20 shown in FIG. 11 is designed to meet this problem. In the example of FIG. 11, sun gear 23s of simple planetary gear set 23 is an input member to which rotation of high speed damper 27 is inputted, ring gear 23r is a reaction member held by one-way clutch 25 so as to prevent rotation in the reverse direction opposite to the engine rotational direction, and carrier 23c is an output member from which rotation is delivered to transmission input shaft 3.

Low speed damper 28 is connected between carrier 23c and transmission input shaft 3 (terminal output member of auxiliary transmission 20). High speed select clutch 24 is arranged coaxially between sun gear 23s serving as input member receiving rotation from high speed damper 27, and transmission input shaft 3 (terminal output member of auxiliary transmission 20) for connection and disconnection between sun gear 23s and transmission input shaft 3. Clutch hub 24h of high speed select clutch 24 is so connected as to receive rotation from high speed damper 27, sun gear 23s is connected with clutch hub 24h, and clutch drum 24d of high speed select clutch 24 is connected with transmission input shaft 3 so that clutch drum 24d and transmission input shaft 3 rotate together.

When high speed select clutch 24 is disengaged, rotation from high speed damper 27 is transmitted, as shown by solid lines in FIG. 12, through clutch hub 24h to sun gear 23s. Sun gear 23s drives carrier 23c at reduced speed in the same direction by the aid of ring gear 23r serving as reaction member held by one-way clutch 25 so as to prevent reverse rotation opposite to the engine rotational direction. From carrier 23c, rotation is further transmitted through low speed damper 28 to transmission input shaft 3. Thus, auxiliary transmission 20 can transmit torque in the speed reduction mode of the low speed select state.

When high speed select clutch 24 is engaged, rotation from high speed damper 27 is transmitted directly to transmission input shaft 3, as shown by solid lines in FIG. 13, through the torque path bypassing carrier 23c and low speed damper 28. Thus, auxiliary transmission 20 can transmit torque in the direct drive mode of the high speed select state without using carrier 23c and low speed damper 28 as torque path.

The transmission system of FIGS. 11~13 can provide the same effects as in the preceding embodiments. Moreover, the transmission system of FIGS. 11~13 can improve the durability of pinion shafts 23t and the life span of auxiliary transmission 20. Pinion shafts 23t contribute to power transmission only in the low speed select state shown by solid lines in FIG. 12. Pinion shafts 23t do not participate in power transmission in the high speed select state shown by solid lines in FIG. 13. Therefore, pinion shafts 23t need not bear load in the high speed select state. This embodiment can prevent decrease in the durability of pinion shafts 23t and decrease in the life of auxiliary transmission 20, and eliminates the need for larger-diameter pinion shafts.

Figure 14:
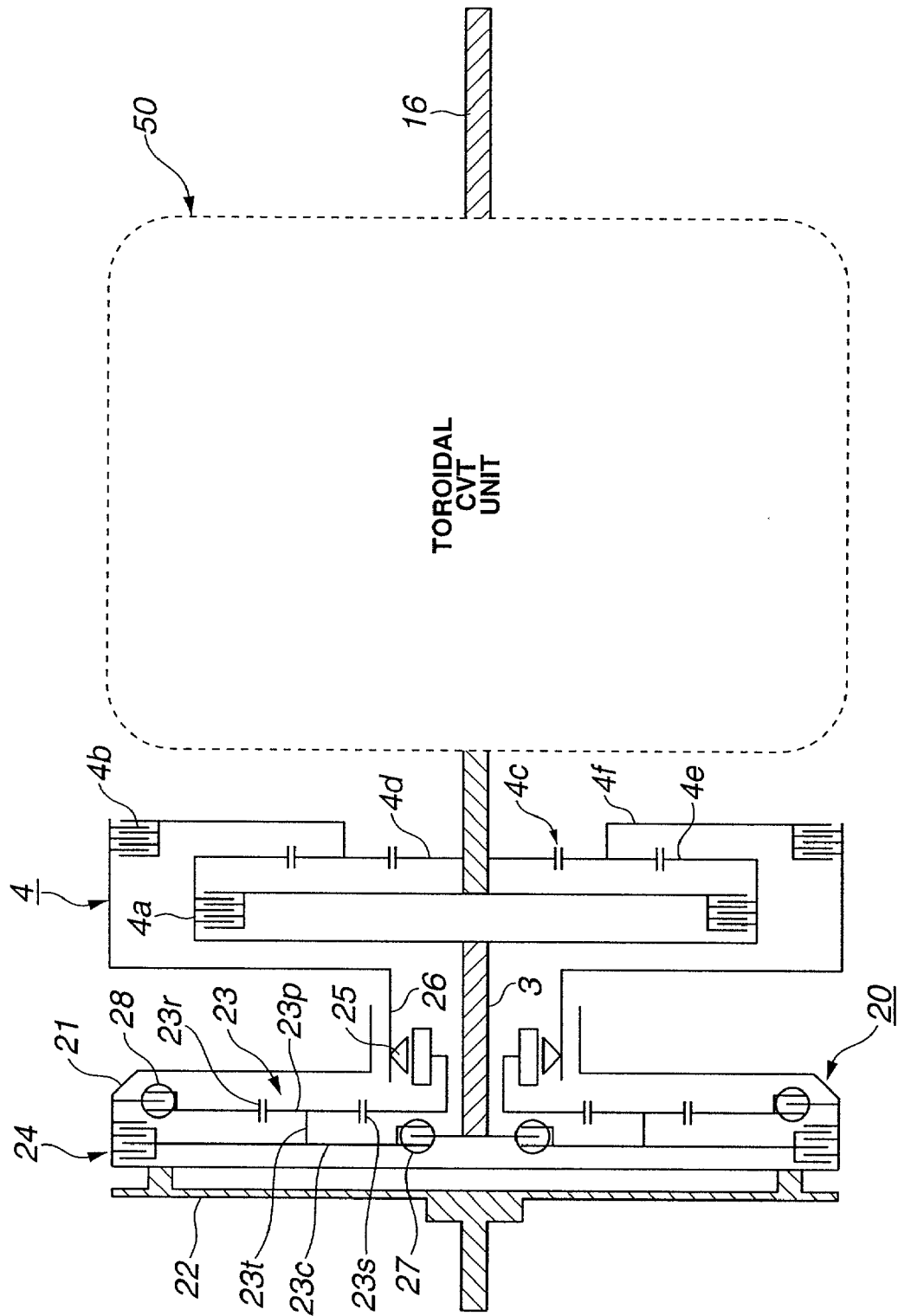
FIG. 14 is a schematic view showing a toroidal CVT transmission system according to a sixth embodiment of the present invention.
Figure 15:
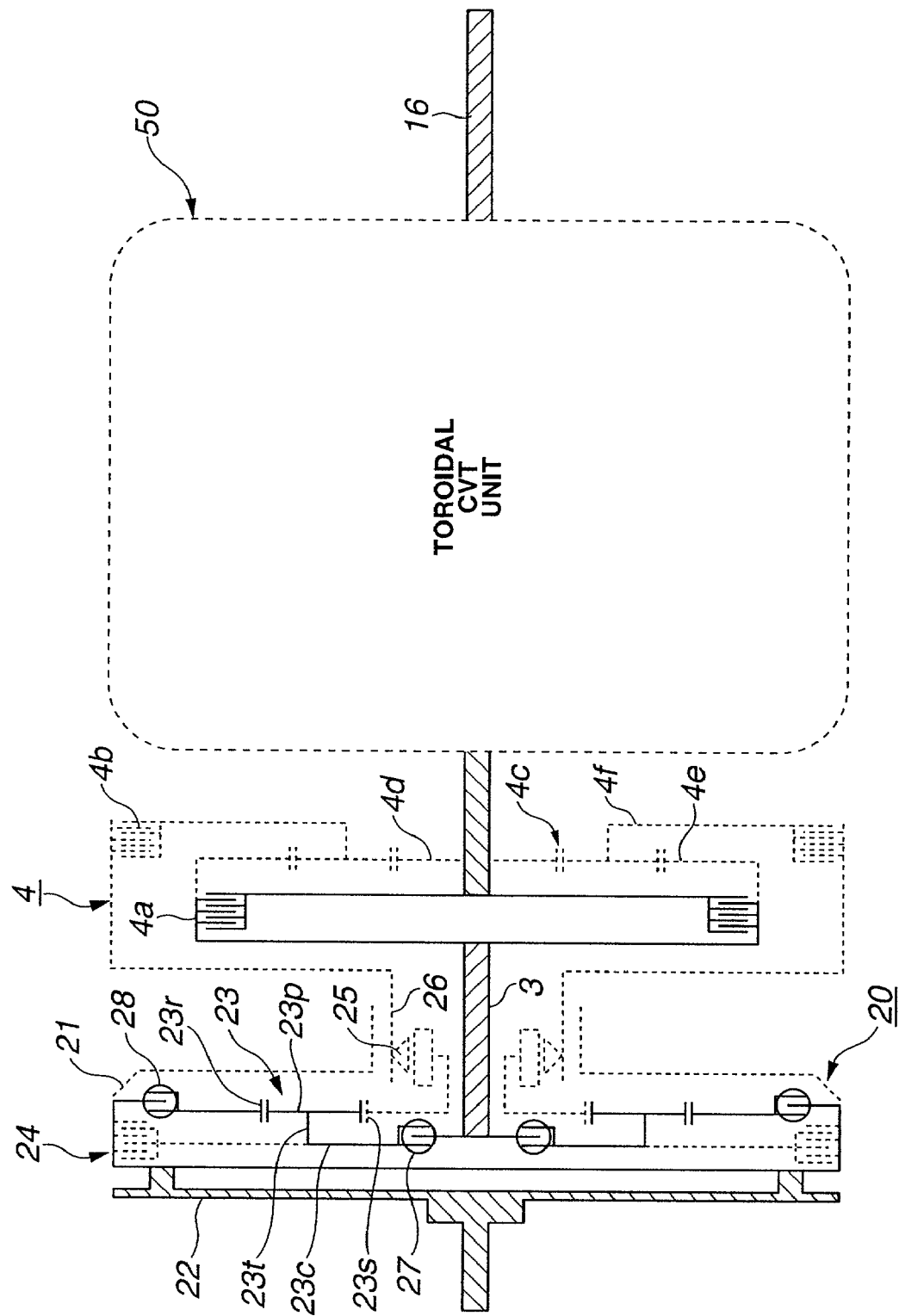
FIG. 15 is a schematic view showing the toroidal CVT transmission system of FIG. 14, with an auxiliary transmission in the low speed select state.
Figure 16:
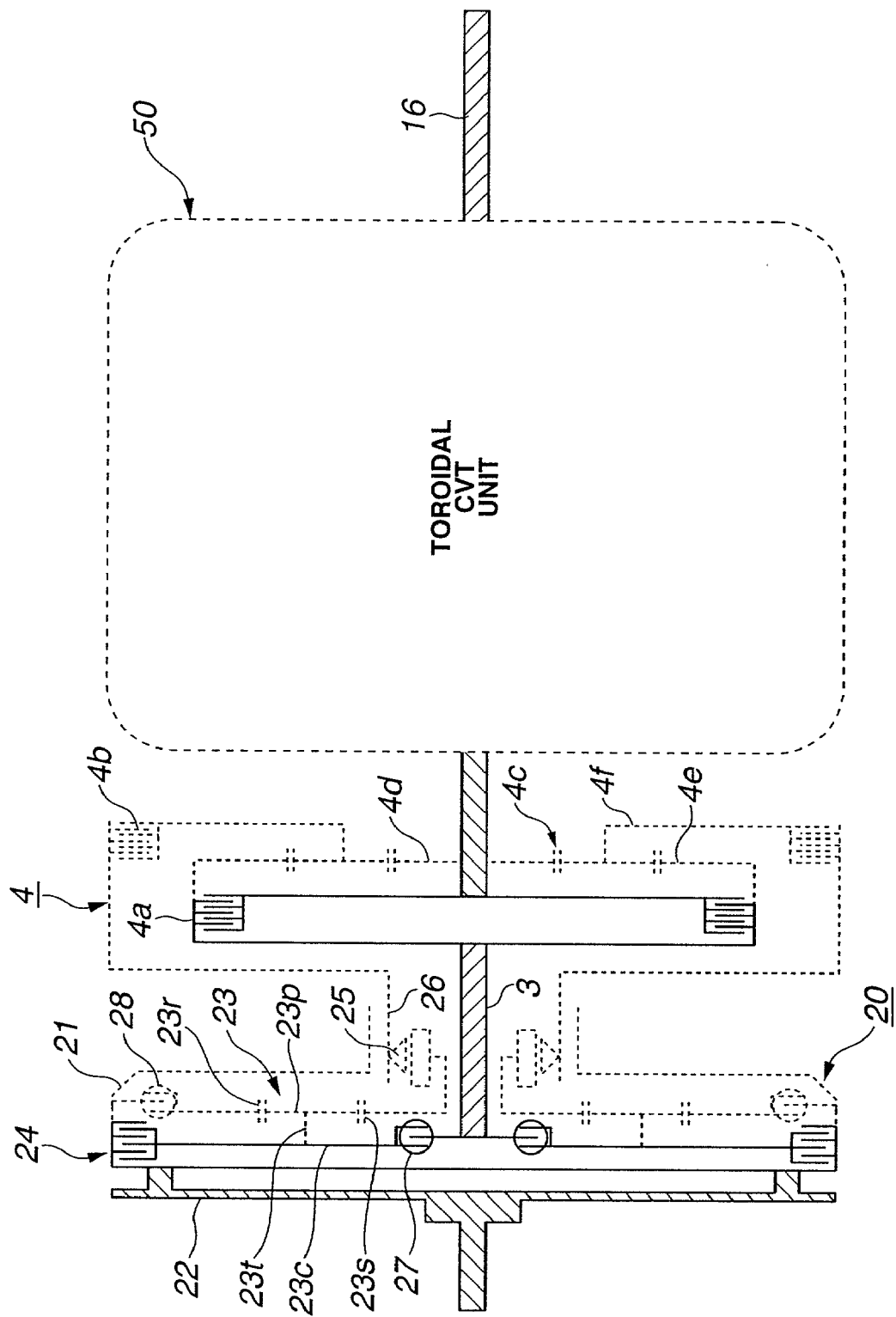
FIG. 16 is a schematic view showing the toroidal CVT transmission system of FIG. 14, with the auxiliary transmission in the high speed select state.

FIGS. 14, 15 and 16 show a transmission system according to a sixth embodiment of the present invention. The transmission system of the sixth embodiment is also designed to improve the durability of pinion shafts 23t.

In auxiliary transmission 20 shown in FIG. 14, ring gear 23r of simple planetary gear set 23 is an input member to which rotation of housing 21 is inputted, sun gear 23s is a reaction member held by one-way clutch 25 so as to prevent rotation in the reverse direction opposite to the engine rotational direction, and carrier 23c is an output member from which rotation is delivered to transmission input shaft 3.

Low speed damper 28 is connected between ring gear 23r and housing 21. High speed damper 27 is connected between carrier 23c and transmission input shaft 3. High speed select clutch 24 is connected between housing 21 and high speed damper 27 (carrier 23c), and arranged to achieve connection and disconnection between housing 21 (serving as the terminal input member of auxiliary transmission 20) and transmission input shaft 3 (serving as the terminal output member of auxiliary transmission 20).

When high speed select clutch 24 is disengaged, rotation of housing 21 is transmitted, as shown by solid lines in FIG. 15, through low speed damper 28, to ring gear 23r. Ring gear 23r drives carrier 23c at reduced speed in the same direction by the aid of sun gear 23r serving as reaction member held by one-way clutch 25 so as to prevent reverse rotation opposite to the engine rotational direction. From carrier 23c, rotation is further transmitted through high speed damper 27 to transmission input shaft 3. Thus, auxiliary transmission 20 can transmit torque in the speed reduction mode of the low speed select state.

When high speed select clutch 24 is engaged, rotation of housing 21 is transmitted through high speed select clutch 24 and high speed damper 27, to transmission input shaft 3, as shown by solid lines in FIG. 16, through the torque path bypassing low speed damper 28 and carrier 23c. Thus, auxiliary transmission 20 can transmit torque in the direct drive mode of the high speed select state without using low speed damper 28 and carrier 23c as torque path.

The transmission system of FIGS. 14~16 can provide the same effects as in the first embodiment. Moreover, the transmission system of FIGS. 14~16 can improve the durability of pinion shafts 23t and the life span of auxiliary transmission 20 as in the fifth embodiment. Pinion shafts 23t contribute to power transmission only in the low speed select state shown by solid lines in FIG. 15. Pinion shafts 23t do not participate in power transmission in the high speed select state shown in FIG. 16. Therefore, pinion shafts 23t need not bear load in the high speed select state. This embodiment can prevent decrease in the durability of pinion shafts 23t and decrease in the life of auxiliary transmission 20, and eliminates the need for thicker pinion shafts.

In the first, second, fourth, fifth and sixth embodiments, carrier 23c is used as the output member of simple planetary gear set 23, one of sun gear 23s and ring gear 23r is the input member, and the other of sun gear 23s and ring gear 23r is the reaction member held by one-way clutch 25 in a manner to prevent the reaction member from rotating in the reverse rotational direction opposite to the engine rotational direction in the low speed select state. High speed select clutch 24 is arranged to engage any two of the three rotating members 23c, 23s and 23r of simple planetary gear set 23, and the reaction member is rotatable by free wheeling of one-way clutch 25 in the high speed select state. Therefore, auxiliary transmission 20 can be used in place of a torque converter or an electromagnetic clutch, without the need of adding another shaft, compactly in an automatic transmission.

Figure 17:
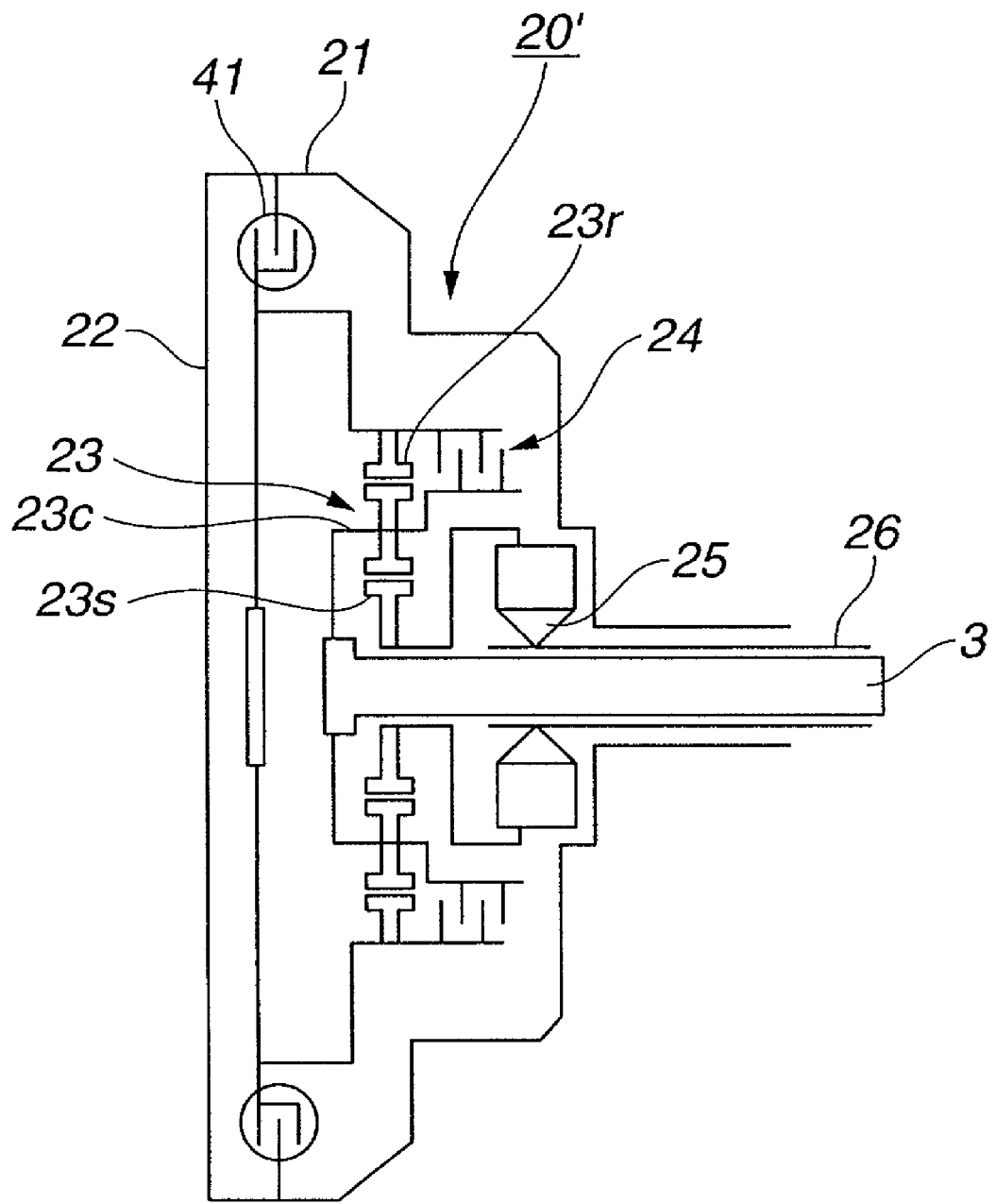
FIG. 17 is a schematic view showing an auxiliary transmission according to a seventh embodiment of the present invention.

FIG. 17 shows an auxiliary transmission 20' according to a seventh embodiment of the present invention. Auxiliary transmission 20' can be used in place of auxiliary transmission 20 in the first embodiment shown in FIGS. 1~3 or in the third embodiment shown in FIGS. 6~10.

Auxiliary transmission 20' of FIG. 17 includes a simple planetary gear set 23, a common damper 41 used for both the high speed select state and low speed select state, a high speed select clutch 24 and a one-way clutch 25.

Planet carrier 23c of simple planetary gear set 23 is connected with transmission input shaft 3 (terminal output member of auxiliary transmission 20'). Common damper 41 is connected between ring gear 23r and housing 21 (which can serve as terminal input member of auxiliary transmission 20'). One-way clutch 25 is connected between sun gear 23s and hollow fixed shaft 26, and arranged to prevent rotation in the reverse direction opposite to the engine rotational direction.

High speed select clutch 24 is connected between carrier 23c and ring gear 23r of simple planetary gear set 23. When high speed select clutch 24 is engaged, carrier 23c and ring gear 23r are connected together, and the three rotating elements (sun gear, ring gear and planet carrier) of simple planetary gear set 23 are in the interlocked state. It is possible to put planetary gear set 23 in the interlocked state by engaging any two of the three rotating members of the planetary gear set.

When high speed select clutch 24 is disengaged, engine rotation is transmitted through common damper 41 to ring gear 23r, and ring gear 23r drives carrier 23c at a reduced speed with the aid of sun gear 23s serving as the reaction member held by one-way clutch 25 to prevent rotation in the reverse direction. Auxiliary transmission 20' can transmit rotation to main transmission 80 in the speed reduction mode of the low speed select state.

When high speed select clutch 24 is engaged, engine rotation is transmitted through common damper 41, and further transmitted through carrier 23c to transmission input shaft 3 in the direct drive mode of the high speed select state.

In the seventh embodiment, too, carrier 23c is used as the output member of simple planetary gear set 23, one of sun gear 23s and ring gear 23r is the input member, and the other of sun gear 23s and ring gear 23r is the reaction member held by one-way clutch 25 in a manner to prevent the reaction member from rotating in the reverse rotational direction opposite to the engine rotational direction in the low speed select state. High speed select clutch 24 is arranged to engage any two of the three rotating members 23c, 23s and 23r of simple planetary gear set 23, and the reaction member is rotatable by free wheeling of one-way clutch 25 in the high speed select state. Therefore, auxiliary transmission 20' according to the seventh embodiment can be used in place of a torque converter or an electromagnetic clutch, without the need of adding another shaft, compactly in an automatic transmission.

Figure 18:
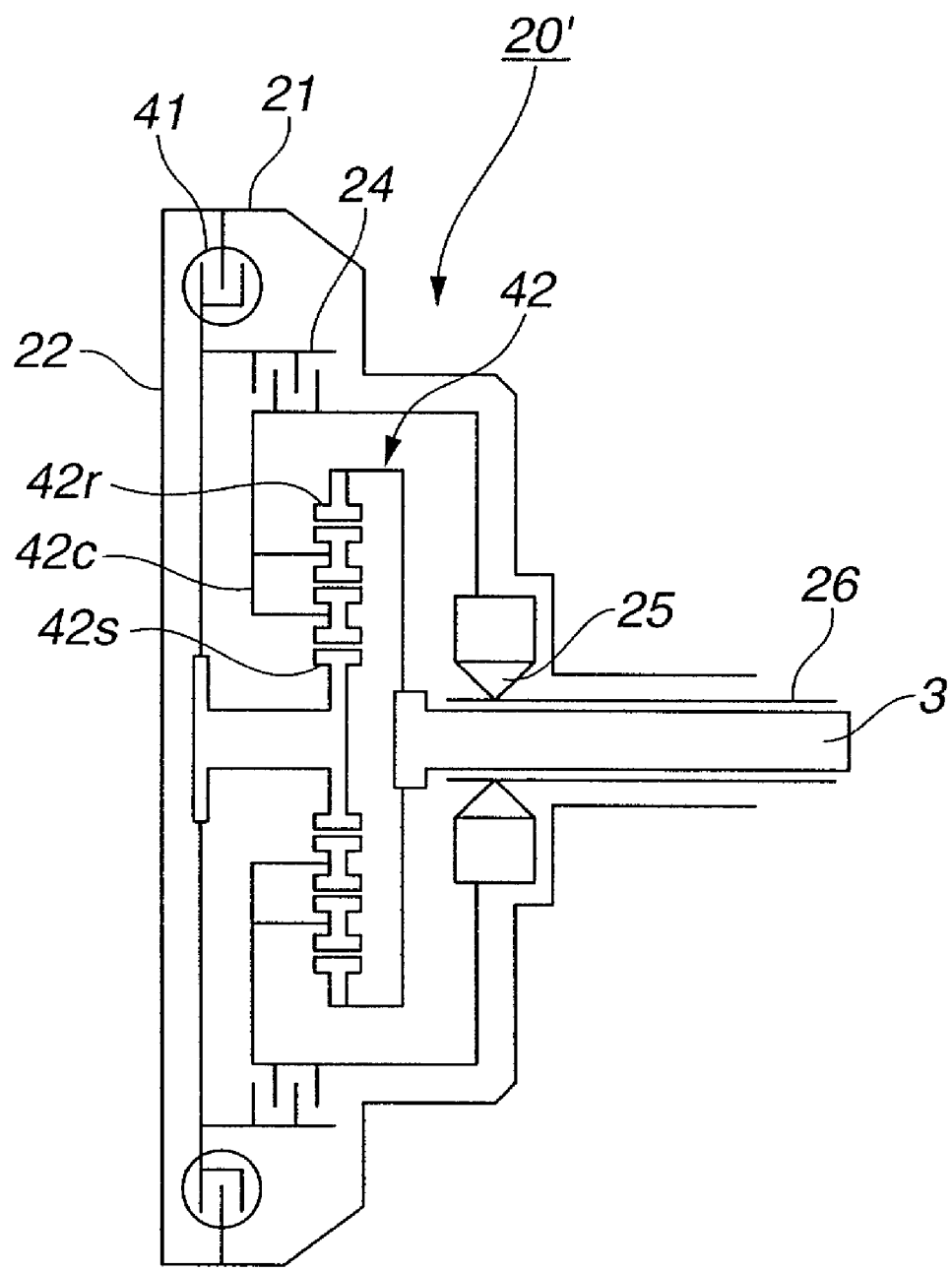
FIG. 18 is a schematic view showing an auxiliary transmission according to an eighth embodiment of the present invention.

FIG. 18 shows an auxiliary transmission 20' according to an eighth embodiment of the present invention. Auxiliary transmission 20' can be used in place of auxiliary transmission 20 in the first embodiment shown in FIGS. 1~3 or in the third embodiment shown in FIGS. 6~10.

In auxiliary transmission 20' of FIG. 18, the planetary gear set is a double pinion planetary gear set 42. Ring gear 42r of double pinion planetary gear set 42 is connected with transmission input shaft 3 (terminal output member of auxiliary transmission 20'). Common damper 41 is connected between sun gear 42s and housing 21 (which can serve as terminal input member of auxiliary transmission 20'). One-way clutch 25 is connected between carrier 42c and hollow fixed shaft 26, and arranged to prevent rotation in the reverse direction opposite to the engine rotational direction.

High speed select clutch 24 is connected between carrier 42c and sun gear 42s of double pinion planetary gear set 42. When high speed select clutch 24 is engaged, carrier 42 and sun gear 42s are connected together, and the three rotating elements (sun gear, ring gear and planet carrier) of double pinion planetary gear set 42 are in the interlocked state. It is possible to arrange high speed select clutch 24 between any two of the three rotating members of double pinion planetary gear set 42, to put double pinion planetary gear set 42 in the interlocked state by engaging any two of the three rotating members of the planetary gear set.

When high speed select clutch 24 is disengaged, engine rotation is transmitted through common damper 41 to sun gear 42s, and sun gear 42s drives ring gear 42r at a reduced speed with the aid of carrier 42c serving as the reaction member held by one-way clutch 25 to prevent rotation in the reverse direction. Auxiliary transmission 20' of FIG. 18 can transmit rotation to main transmission 80 in the speed reduction mode of the low speed select state.

When high speed select clutch 24 is engaged, engine rotation is transmitted through common damper 41, and further transmitted, through the double pinion planetary gear set 42 in the interlocked state, to transmission input shaft 3 in the direct drive mode of the high speed select state.

Figure 19:
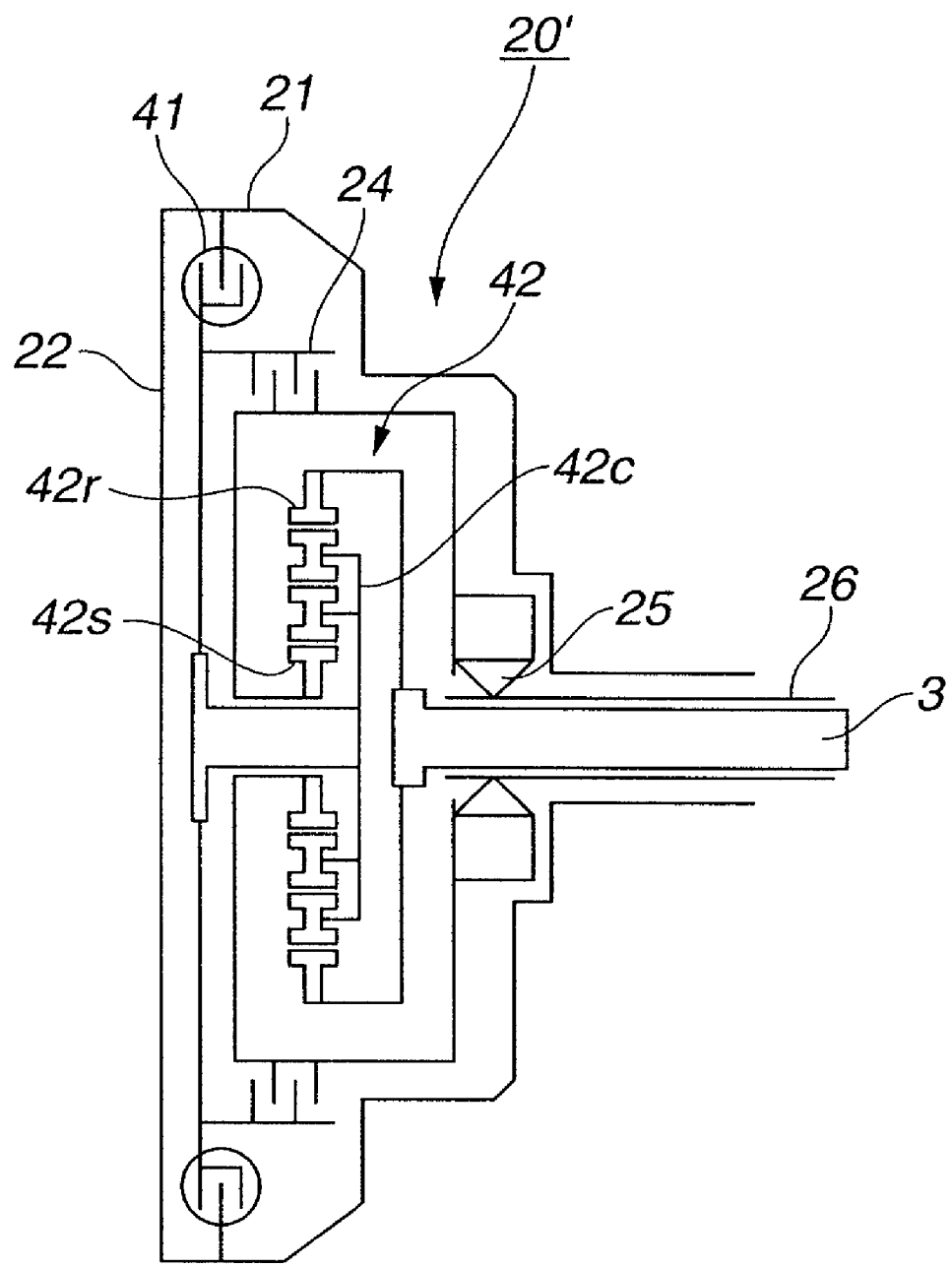
FIG. 19 is a schematic view showing an auxiliary transmission according to a ninth embodiment of the present invention.

FIG. 19 shows an auxiliary transmission 20' according to a ninth embodiment of the present invention. Auxiliary transmission 20' can be used in place of auxiliary transmission 20 in the first embodiment shown in FIGS. 1~3 or in the third embodiment shown in FIGS. 6~10.

In auxiliary transmission 20' of FIG. 19, too, the planetary gear set is a double pinion planetary gear set 42. Ring gear 42r of double pinion planetary gear set 42 is connected with transmission input shaft 3 (terminal output member of auxiliary transmission 20'). Common damper 41 is connected between carrier 42c and housing 21 (which can serve as terminal input member of auxiliary transmission 20'), so that engine rotation is inputted to carrier 42c. One-way clutch 25 is connected between sun gear 42s and hollow fixed shaft 26, and arranged to prevent rotation in the reverse direction opposite to the engine rotational direction.

High speed select clutch 24 is connected between carrier 42c and sun gear 42s of double pinion planetary gear set 42. When high speed select clutch 24 is engaged, carrier 42 and sun gear 42s are connected together, and the three rotating elements (sun gear, ring gear and planet carrier) of double pinion planetary gear set 42 are in the interlocked state. It is possible to arrange high speed select clutch 24 between any two of the three rotating members of double pinion planetary gear set 42, to put double pinion planetary gear set 42 in the interlocked state by engaging any two of the three rotating members of the planetary gear set.

When high speed select clutch 24 is disengaged, engine rotation is transmitted through common damper 41 to carrier 42c, and carrier 42c drives ring gear 42r at a reduced speed with the aid of sun gear 42s serving as the reaction member held by one-way clutch 25 to prevent rotation in the reverse direction. Thus, auxiliary transmission 20' of FIG. 19 can transmit rotation to main transmission 80 in the speed reduction mode of the low speed select state.

When high speed select clutch 24 is engaged, engine rotation is transmitted through common damper 41, and further transmitted, through the double pinion planetary gear set 42 in the interlocked state, to transmission input shaft 3 in the direct drive mode of the high speed select state.

In the eighth and ninth embodiments of FIG. 18 and FIG. 19, ring gear 42r is used as the output member of double pinion planetary gear set 42, one of sun gear 42s and carrier 42c is the input member, and the other of sun gear 42s and carrier 42c is the reaction member held by one-way clutch 25 in a manner to prevent the reaction member from rotating in the reverse rotational direction opposite to the engine rotational direction in the low speed select state. High speed select clutch 24 is arranged to engage any two of the three rotating members 42c, 42s and 42r of double pinion planetary gear set 42, and the reaction member is rotatable by free wheeling of one-way clutch 25 in the high speed select state. Therefore, auxiliary transmission 20' according to the eighth or ninth embodiments can be used in place of a torque converter or an electromagnetic clutch.

In each of the illustrated embodiments, the main transmission may be transmissions of various other types. For example, the main transmission is a continuously variable transmission of a type other than the toroidal type, or a multi-speed transmission.

According to one aspect of the present invention, an auxiliary transmission for transmitting rotation from a prime mover to a main transmission, comprises; (a) a planetary gear set which includes, a first rotating member serving as an input member to receive rotation from a prime mover in the low speed select state, a second rotating member serving as an output member to deliver rotation by being driven by the input member in the low speed select state, and a third rotating member serving as a reaction member held in the low speed select state for speed reduction and torque multiplication; (b) a holding device to permit rotation of the third rotating member serving as the reaction member of the planetary gear set in a first rotational direction in the high speed select state for effecting direct drive, and to hold the third rotating member to prevent rotation of the third rotating member in a second rotational direction in the low speed select state to effect speed reduction and torque increase; and (c) a high speed select clutch to connect two of the first, second and third rotating members of the planetary gear set in the high speed select state. The planetary gear set may be a simple planetary gear set, or may be a double pinion planetary gear set.

Dampers 27, 28 and 41 serves damping means for providing a damping characteristic. Low speed damper 28 serves as damping means for providing a damper characteristic in the low speed transmission path. At least high speed select clutch 24 can serve as bypassing means for forming a bypass transmission path bypassing the low speed transmission path.

This application is based on prior Japanese Patent Applications: (i) No. 2001-142637 filed in Japan on May 14, 2001; (ii) No. 2001-142653 filed in Japan on May 14; 2001; (iii) No. 2001-142650 filed in Japan on May 14, 2001; and (iv) No. 2001-325049 filed in Japan on Oct. 23, 2001. The entire contents of these Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A transmission apparatus comprising:
   an auxiliary transmission adapted to be connected with a main transmission, and which comprises:
   a low speed damper which is a torsional damper having a damper characteristic for a low speed select state of the auxiliary transmission, and which is disposed in a low speed transmission path used for transmission of torque in the low speed select state of the auxiliary transmission without intervention of a torque converter, wherein the low speed transmission path includes an output terminal member configured to transmit torque from the auxiliary transmission to the main transmission; and
   a bypass member defining a bypass transmission path bypassing the low speed damper, the bypass transmission path being a torque path used for transmission of torque in a high speed select state of the auxiliary transmission, wherein the bypass transmission path includes the output terminal member.

2. The transmission apparatus as claimed in claim 1, wherein the auxiliary transmission has an input side for receiving input rotation and an output side for delivering output rotation to the main transmission.

3. The transmission apparatus as claimed in claim 1, wherein
   the transmission apparatus comprises the main transmission for a vehicle and the auxiliary transmission which is connected on an input side of the main transmission and which has the high speed select state and the low speed select state for speed reduction;
   the main transmission comprises a friction element to bring the main transmission from a neutral state to a drive state; and the transmission apparatus further comprises a controlling section to control the friction element to start the vehicle while putting the auxiliary transmission in the low speed select state.

4. The transmission apparatus as claimed in claim 3, wherein
the main transmission comprises an automatic transmission mechanism, and a forward-reverse switching mechanism which is connected between the auxiliary transmission and the automatic transmission mechanism;
the forward-reverse switching mechanism comprises a forward friction engaging device to put the main transmission in a forward drive state when the forward friction engaging device is engaged, and a reverse friction engaging device to put the main transmission in a reverse drive state when the reverse friction engaging device is engaged, and to put the main transmission in a neutral state when the forward friction engaging device and the reverse friction engagement device are both disengaged; and
the controlling section is configured to control the main transmission from the neutral state to the forward drive state to start the vehicle forward, by bringing the friction element which is the forward friction engaging device from an disengagement state to an engagement state while the auxiliary transmission is in the low speed select state.

5. A transmission apparatus comprising:
an auxiliary transmission adapted to be connected with a main transmission, and which comprises:
a low speed damper which has a damper characteristic for a low speed select state of the auxiliary transmission, and which is disposed in a low speed transmission path used for transmission of torque in the low speed select state of the auxiliary transmission without intervention of a torque converter; and
a bypass member defining a bypass transmission path bypassing the low speed damper, the bypass transmission path being a torque path used for transmission of torque in a high speed select state of the auxiliary transmission,
wherein the auxiliary transmission further comprises:
a high speed damper which has a damper characteristic for the high speed select state, and which is disposed in a common transmission path used for transmission of torque in both of the low speed select state and the high speed select state of the auxiliary transmission.

6. The transmission apparatus as claimed in claim 5, wherein the auxiliary transmission further comprises:
a planetary gear set which includes,
a first rotating member serving as an input member to receive rotation from a prime mover in the low speed select state,
a second rotating member serving as an output member to deliver rotation by being driven by the input member in the low speed select state, and
a third rotating member serving as a reaction member held in the low speed select state for speed reduction and torque multiplication; and wherein the auxiliary transmission further comprises,
a holding device to hold the reaction member of the planetary gear set in the low speed select state.

7. The transmission apparatus as claimed in claim 6, wherein the bypass member comprises, a high speed select clutch to form the bypass transmission path in the high speed select state in which the high speed select clutch is engaged.

8. The transmission apparatus as claimed in claim 7, wherein the high speed select clutch is connected between two of the first, second and third rotating members of the planetary gear set; the holding device is connected with the third rotating member of the planetary gear set to permit rotation of the third rotating member in a first rotational direction in the high speed select state and to prevent rotation of the third rotating member in a second rotational direction in the low speed select state; the planetary gear set is in a speed reduction state effecting speed reduction and torque increase in the low speed select state in which the high speed select clutch is disengaged and the holding device is in a state to prevent rotation of the third rotating member in the second rotational direction; and the planetary gear set is in a direct drive state causing no change in speed and rotational direction between the input member and output member of the planetary gear set in the high speed select state in which the high speed select clutch is engaged to connect the two of the first, second and third rotating members and the holding device is in a state to permit rotation of the third rotating member in the first rotational direction.

9. The transmission apparatus as claimed in claim 6, wherein the holding device is a one-way clutch to hold the third rotating member of the planetary gear set in the low speed select state to prevent rotation of the third rotating member in the second rotational direction which is opposite to a rotational direction of input rotation from the prime mover.

10. The transmission apparatus as claimed in claim 9, wherein the one-way clutch comprises an inner race fixed stationary, and an outer race connected with the third rotating member of the planetary gear set.

11. The transmission apparatus as claimed in claim 6, wherein the planetary gear set is a simple planetary gear set, the second rotating member serving as the output member is a planet carrier of the planetary gear set, the first rotating member serving as the input member is one of a sun gear and a ring gear of the planetary gear set, and the third rotating member serving as the reaction member is the other of the sun gear and the ring gear.

12. The transmission apparatus as claimed in claim 11, wherein the high speed damper and the low speed damper are connected in series so that input rotation from the prime mover is transmitted through the high speed damper to the low speed damper in the low speed select state.

13. The transmission apparatus as claimed in claim 12, wherein the high speed select clutch is connected between the high speed damper and the second rotating member serving as the output member of the planetary gear set, and arranged to transmit rotation from the high speed damper directly to the output member of the planetary gear set in the high speed select state.

14. The transmission apparatus as claimed in claim 13, wherein the low speed damper is connected with the sun gear which is the first rotating member serving as the input member of the planetary gear set in the low speed select state, and the holding device is connected with the ring gear which is the third rotating member serving as the reaction member of the planetary gear set in the low speed select state.

15. The transmission apparatus as claimed in claim 13, wherein the low speed damper is connected with the ring gear which is the first rotating member serving as the input member of the planetary gear set in the low speed select state, and the holding device is connected with the sun gear which is the third rotating member serving as the reaction member of the planetary gear set in the low speed select state.

16. The transmission apparatus as claimed in claim 11, wherein the auxiliary transmission is arranged to transmit rotation from an input terminal member to an output terminal member for delivering rotation to the main transmission; and the high speed select clutch and the high speed damper are connected in series to form a direct torque path from the input terminal member to the output terminal member without passing through the planet carrier of the planetary gear set in the high speed select state.

17. The transmission apparatus as claimed in claim 16, wherein the high speed damper is connected between the input terminal member and the first rotating member serving as the input member of the planetary gear set; the low speed damper is connected between the second rotating member serving as the output member of the planetary gear set and the output terminal member; and the high speed select clutch is connected between the high speed damper and the output terminal member.

18. The transmission apparatus as claimed in claim 16, wherein the high speed damper is connected between the second rotating member serving as the output member of the planetary gear set and the out terminal member; the low speed damper is connected between the input terminal member and the first rotating member serving as the input member of the planetary gear set; and the high speed select clutch is connected between the input terminal member and the high speed damper.

19. The transmission apparatus as claimed in claim 6, wherein the planetary gear set is a double pinion planetary gear set; the first rotating member serving as the input member is a planet carrier of the double pinion planetary gear set, the second rotating member serving as the output member is a ring gear of the double pinion planetary gear set, and the third rotating member serving as the reaction member is a sun gear of the double pinion planetary gear set; the high speed damper is connected with the low speed damper so that input rotation is transmitted through the high speed damper to the low speed damper; the low speed damper has an input side connected with the high speed damper and an output side connected with the planet carrier of the double pinion planetary gear set; the high speed select clutch is connected between the ring gear of the double planetary gear set and the input side of the low speed damper; and the holding device is a low speed select brake arranged to hold the sun gear of the double planetary gear set.

20. An auxiliary transmission for supplementing a main transmission, the auxiliary transmission comprising:
  damping means for providing a damper characteristic for a low speed select state of the auxiliary transmission, in a low speed transmission path used for transmission of torque in a low speed select state of the auxiliary transmission without intervention of a torque converter, wherein the low speed transmission path includes an output terminal member configured to transmit torque from the auxiliary transmission to the main transmission; and
  bypassing means for forming a bypass transmission path bypassing the low speed transmission path in a high speed select state of the auxiliary transmission, wherein the bypass transmission path includes the output terminal member.

21. An auxiliary transmission for transmitting torque to a main transmission, comprising:
  an output terminal member configured to transmit torque from the auxiliary transmission to the main transmission;
  a low speed damper configured to transmit torque during a low speed select state along a low speed transmission path without intervention of a torque converter, that includes the output terminal member, the low speed damper being a torsional damper; and
  a bypass member configured to bypass the low speed damper during a high speed select state and to transmit torque along a high speed transmission path that includes the output terminal member.

22. The auxiliary transmission of claim 21, wherein the output terminal member comprises an input shaft of the main transmission.

23. The auxiliary transmission of claim 21, further comprising a high speed damper configured to transmit torque along the high speed transmission path during the high speed select state.

24. The auxiliary transmission of claim 23, wherein the high speed damper is configured to transmit torque along the low speed transmission path during the low speed select state.

* * * * *